US011480127B2

(12) United States Patent
Banker et al.

(10) Patent No.: US 11,480,127 B2
(45) Date of Patent: Oct. 25, 2022

(54) SYSTEMS AND METHODS FOR A DUAL FUEL SYSTEM OF A VARIABLE DISPLACEMENT ENGINE

(71) Applicant: Ford Global Technologies, LLC, Dearborn, MI (US)

(72) Inventors: Adam Banker, Canton, MI (US); Ross Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 16/880,782

(22) Filed: May 21, 2020

(65) Prior Publication Data

US 2020/0284216 A1 Sep. 10, 2020

Related U.S. Application Data

(62) Division of application No. 15/969,486, filed on May 2, 2018, now Pat. No. 10,711,725.

(51) Int. Cl.
*F02D 41/00* (2006.01)
*F02D 41/30* (2006.01)
*F02M 37/18* (2006.01)
*F02D 17/02* (2006.01)
*F02M 37/00* (2006.01)

(52) U.S. Cl.
CPC ..... *F02D 41/3082* (2013.01); *F02D 41/3094* (2013.01); *F02D 17/02* (2013.01); *F02D 2200/0604* (2013.01); *F02M 37/0052* (2013.01); *F02M 37/18* (2013.01)

(58) Field of Classification Search
CPC ............. F02D 41/3082; F02D 41/3094; F02D 41/0087; F02D 41/3854; F02D 41/3845; F02D 41/402; F02D 17/02; F02D 2200/0604; F02D 2041/3881; F02D 2041/389; F02M 37/0052; F02M 37/18; F02M 63/0285
See application file for complete search history.

(56) References Cited

U.S. PATENT DOCUMENTS

| 8,651,091 | B2 | 2/2014 | Tripathi et al. |
| 9,217,339 | B2 | 12/2015 | McConville et al. |
| 9,506,411 | B2 | 11/2016 | Glugla et al. |
| 9,611,801 | B2 | 4/2017 | Surnilla et al. |
| 9,752,530 | B2 | 9/2017 | Surnilla et al. |
| 10,513,998 | B1 * | 12/2019 | Uhrich ................ F02D 41/2464 |

(Continued)

*Primary Examiner* — Phutthiwat Wongwian
*Assistant Examiner* — Sherman D Manley
(74) *Attorney, Agent, or Firm* — Vincent Mastrogiacomo; McCoy Russell LLP

(57) ABSTRACT

Systems and methods are provided for operating a port fuel and direct injection fuel system of a rolling variable displacement engine (rVDE). In one example, a method may include selecting between controlling a lift pump of the fuel system to output fuel at a mechanically limited pressure and controlling the lift pump to output fuel at a pressure lower than the mechanically limited pressure based on whether port fuel injection is used. In this way, the lift pump may be controlled without feedback from a pressure sensor, reducing system costs, while electrical power consumption increases due to operating the lift pump to output fuel at the mechanically limited pressure are minimized due to the rVDE technology, which reduces port fuel injection usage.

16 Claims, 6 Drawing Sheets

(56) References Cited

U.S. PATENT DOCUMENTS

| | | | |
|---|---|---|---|
| 2005/0098155 A1* | 5/2005 | Yamazaki | F02M 59/102 123/431 |
| 2006/0075992 A1* | 4/2006 | Akita | F02D 41/3845 123/431 |
| 2012/0048242 A1* | 3/2012 | Surnilla | F02D 19/024 123/497 |
| 2014/0224209 A1* | 8/2014 | Pursifull | F02D 41/3845 123/294 |
| 2015/0075484 A1* | 3/2015 | VanDerWege | F02M 63/0001 123/294 |
| 2015/0275816 A1* | 10/2015 | Pursifull | F02D 41/3094 123/456 |
| 2015/0285166 A1* | 10/2015 | Surnilla | F02D 19/0605 123/294 |
| 2016/0025030 A1* | 1/2016 | Ulrey | F02D 41/3854 123/294 |
| 2016/0115878 A1 | 4/2016 | VanDerWege | |
| 2016/0153385 A1* | 6/2016 | Pursifull | F02D 41/3845 123/456 |
| 2016/0363104 A1* | 12/2016 | Sanborn | F02D 41/401 |
| 2016/0377015 A1* | 12/2016 | Pursifull | F02M 63/029 701/103 |
| 2017/0022926 A1 | 1/2017 | Sanborn et al. | |
| 2017/0204803 A1* | 7/2017 | Pursifull | F02D 41/3845 |
| 2017/0350341 A1* | 12/2017 | Courtiel | F02D 41/0025 |
| 2018/0148038 A1* | 5/2018 | Ulrey | B60W 20/15 |
| 2018/0328304 A1* | 11/2018 | Pursifull | F02D 41/2467 |
| 2018/0328306 A1* | 11/2018 | Pursifull | F02D 41/3094 |
| 2019/0293017 A1* | 9/2019 | Ulrey | F02D 41/3082 |

\* cited by examiner

SYSTEMS AND METHODS FOR A DUAL FUEL SYSTEM OF A VARIABLE DISPLACEMENT ENGINE

CROSS REFERENCE TO RELATED APPLICATIONS

The present application is a divisional of U.S. non-provisional patent application Ser. No. 15/969,486, entitled "SYSTEMS AND METHODS FOR A DUAL FUEL SYSTEM OF A VARIABLE DISPLACEMENT ENGINE," filed on May 2, 2018. The entire contents of the above-referenced application are hereby incorporated by reference in its entirety for all purposes.

FIELD

The present description relates to systems and methods for controlling fuel injection of an internal combustion engine.

BACKGROUND/SUMMARY

Engines may be configured with various fuel systems used to deliver a desired amount of fuel to an engine for combustion. Port fuel direct injection (PFDI) engines include both port injection and direct injection of fuel and may advantageously utilize each injection mode. For example, at higher engine loads, fuel may be injected into the engine using direct fuel injection for increased engine performance (e.g., by increasing available torque and fuel economy). At lower engine loads and during engine starting, fuel may be injected into the engine using port fuel injection to provide increased fuel vaporization for enhanced mixing and to reduce engine emissions. Further, port fuel injection may provide increased fuel economy over direct injection at lower engine loads. In addition, both port injectors and direct injectors may be operated together under some conditions to leverage advantages of both types of fuel delivery or, in some instances, differing fuels.

In PFDI engines, a lift pump (also termed, low pressure pump) supplies fuel from a fuel tank to both port fuel injectors and a direct injection fuel pump (also termed, high pressure pump). The direct injection fuel pump may supply fuel at a higher, variable pressure to direct injectors. In some examples, the port fuel injection (PFI) portion of the PFDI system may be mechanically controlled to a fixed PFI fuel rail pressure via an in-tank regulator. In other examples, the PFI system may be controlled via closed-loop pressure control. Operating at the fixed PFI fuel rail pressure may increase lift pump usage, which increases electrical power consumption, while operating with closed-loop pressure control requires feedback from a PFI fuel rail pressure sensor, which increases system costs. Therefore, vehicle manufacturers may weigh the cost of including a PFI fuel rail pressure sensor against savings in electrical power consumption when choosing the control strategy of the PFI portion of the PFDI system.

Furthermore, some engines may be configured to operate with a variable number of active or deactivated cylinders to increase fuel economy, known as variable displacement engines (VDE). Therein, a subset of the cylinders may be disabled during selected conditions defined by parameters such as a speed/load window while remaining cylinders continue to produce torque. A VDE control system may disable the subset of cylinders, such as a bank of cylinders, through the control of a plurality of cylinder valve deactivators that affect operation of the cylinder's intake and exhaust valves and through deactivating fuel injectors of the subset of cylinders. Further increases in fuel economy can be achieved in engines configured to vary the effective displacement of the engine by skipping the delivery of fuel to certain cylinders in an indexed cylinder firing pattern, also referred to as a "skip-fire" pattern. Such engines may be referred to as rolling variable displacement engines (rVDE).

The inventors herein have recognized that when a PFDI system is combined with rVDE technology, the PFI system is rarely used. For example, instead of using PFI for increased fuel economy at lower engine loads, the engine may instead operate with a subset of the cylinders deactivated, with fuel directly injected in the remaining active cylinders. Because the PFI system is rarely used, how it is controlled has a relatively small impact on electrical power consumption.

In one example, the issues described above may be addressed by a method for fueling an engine, comprising: selecting between operating a lift pump in a pressure relief mode and a variable pressure mode based on whether the engine is fueled via port fuel injectors; and adjusting an output of the lift pump while operating in the variable pressure mode based on a fractional volume loss of a high pressure pump measured while operating the lift pump in the pressure relief mode. In this way, the lift pump may be controlled in a higher electrical power consumption mode (e.g., the pressure relief mode) only while PFI is performed, and operation in the pressure relief mode may be opportunistically used for high pressure pump fractional volume loss calibration for subsequent operation in a lower electrical consumption mode (e.g., the variable pressure mode).

As one example, operating the lift pump in the pressure relief mode includes supplying fuel at a fixed lift pump outlet pressure, the fixed lift pump outlet pressure defined by a pressure setpoint of a mechanical pressure relief valve positioned downstream of the lift pump with no additional pressure relief valves positioned in between. Furthermore, operating the lift pump in the pressure relief mode includes supplying voltage to the lift pump that is greater than or equal to a threshold voltage. As another example, operating the lift pump in the variable pressure mode includes supplying fuel at a variable lift pump outlet pressure that is less than the fixed lift pump outlet pressure, such as by supplying voltage to the lift pump that is less than the threshold voltage. While operating the lift pump in the variable pressure mode, the variable lift pump outlet pressure is adjusted based on the fractional volume loss of the high pressure pump measured while operating the lift pump and further based on a current fractional volume loss error value of the high pressure pump so that the high pressure pump is operated at a desired volumetric efficiency. The pressure relief mode is selected when the engine is fueled at least partially via the port fuel injectors, and the variable pressure mode is selected when the engine is fueled via the direct injectors only. Notably, port fuel injection may be performed during limited conditions, such as engine start and at high (e.g., higher than a threshold) engine speeds. Instead of using port fuel injection, the engine may be transitioned into a variable displacement engine mode at low (e.g., lower than a threshold) engine loads. As such, the pressure relief mode may be rarely selected during engine operation.

While the high pressure pump may be controlled at least partially based on feedback from a pressure sensor at a direct injection fuel rail, the lift pump is controlled without feedback from a pressure sensor. Due to operating the lift pump in the pressure relief mode when port fuel injection is performed, a pressure at a port fuel injection fuel rail is inferred as a fixed, mechanically regulated pressure. In this way, lift pump operation during port fuel injection, direct injection, or both may be accurately controlled without feedback from a pressure sensor, and port fuel injection may also be accurately controlled without feedback from a pressure sensor. As a result of omitting a pressure sensor for lift pump and port fuel injection control, fuel system costs are reduced. As a result of omitting the pressure sensor in the fuel system of a rVDE, additional lift pump power consumption due to operating in the pressure relief mode is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
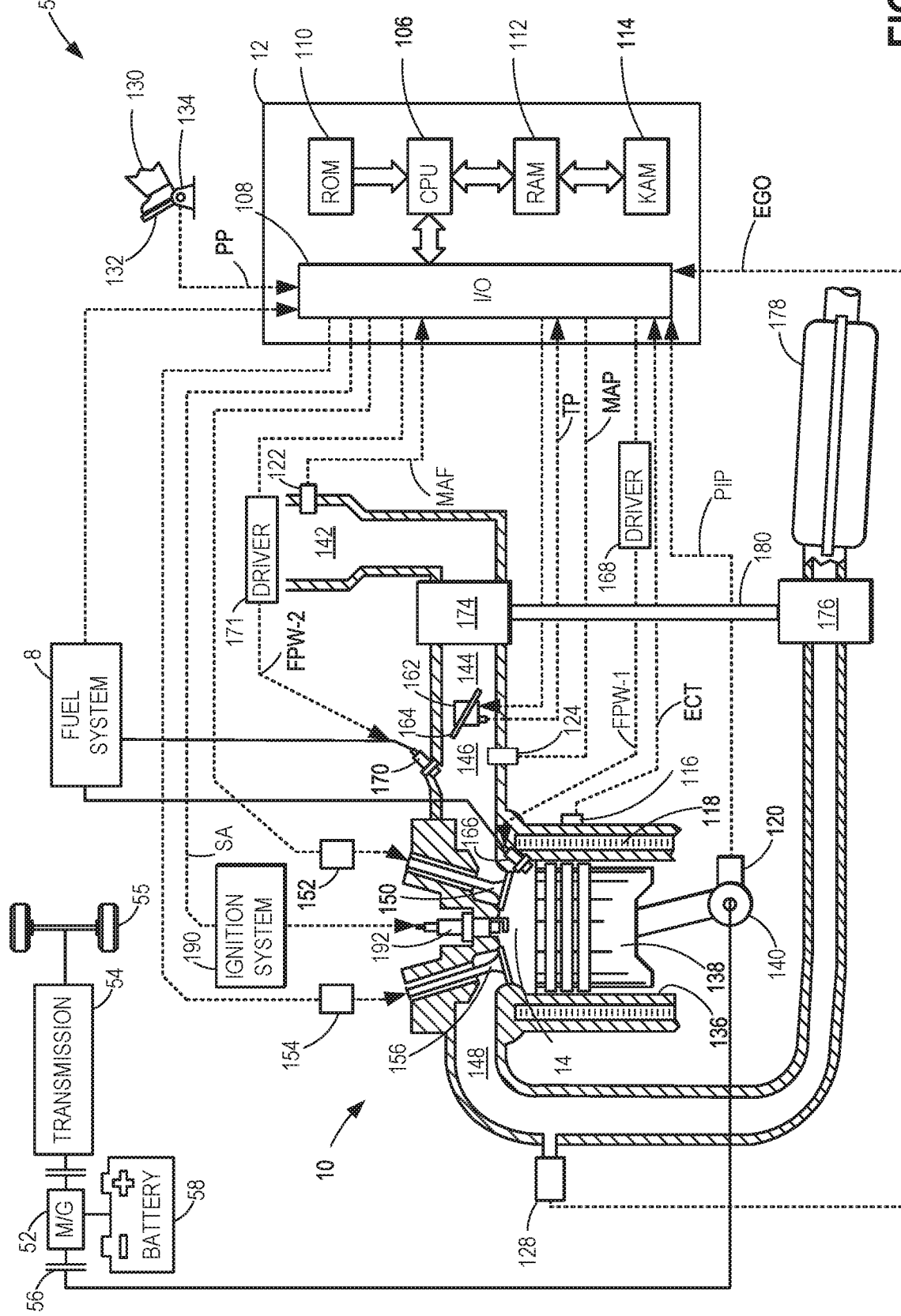
FIG. 1 schematically depicts an example cylinder of an internal combustion engine.

The following description relates to systems and methods for controlling a fuel system of a rolling variable displacement engine (rVDE), such as the engine schematically depicted in FIG. 1. The fuel system may include a low pressure pump (e.g., a lift pump) for delivering fuel to both port fuel injectors and a high pressure pump (e.g., a direct injection pump), as illustrated in the example fuel systems shown in FIGS. 2 and 3. Furthermore, the rVDE technology enables one or more engine cylinders to be selectively deactivated, such as according to the example method of FIG. 4. While the one or more engine cylinders are selectively deactivated, fuel may be provided to the remaining active cylinders via the direct fuel injectors. While operating with all cylinders active, an engine controller may determine whether to deliver fuel via port fuel injection, direct injection, or both based on operating conditions, such as according to the example method of FIG. 5. When port fuel injection is selected, including when fuel is provided via both the port fuel injectors and the direct injectors, the low pressure pump may be controlled to operate at a mechanically limited pressure using an open loop control strategy. When port fuel injection is not selected (e.g., when fuel is provided via the direct injectors only), the low pressure pump may be controlled to operate below the mechanically limited pressure using feedback regarding a fractional volume loss of the high pressure pump. An example timeline illustrating transitioning between port fuel injection, direct injection, and port fuel and direct injection, as well as between rVDE operation and non-VDE operation, is shown in FIG. 6. In this way, both fuel system and engine control may be optimized based on operating conditions in order to increase fuel economy and engine performance.

Turning now to the figures, FIG. 1 depicts an example embodiment of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine, and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174. A throttle position sensor may be provided to measure a position of throttle plate 164.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

As further described herein, intake valve 150 and exhaust valve 156 may be deactivated during selected conditions, such as when the full torque capability of the engine is not needed. For example, one or more cylinders of engine 10 may be selected for deactivation. The number and identity of cylinders selected for deactivation may be symmetrical or asymmetrical, such as by selectively deactivating one or more cylinders on only a first engine bank, selectively deactivating one or more cylinders on only a second engine bank, or selectively deactivating one or more cylinders on each of the first and second engine banks.

Intake valve 150 and exhaust valve 156 may be selectively deactivated via hydraulically actuated lifters (e.g., lifters coupled to valve pushrods), a cam profile switching mechanism (in which a cam lobe with no lift is used for deactivated valves), or electrically actuated cylinder valve mechanisms coupled to each cylinder. In addition, fuel flow and spark to the deactivated cylinders may be stopped, such as by deactivating cylinder fuel injectors. While the selected cylinders are disabled, the remaining enabled or active cylinders continue to carry out combustion, with fuel injectors and cylinder valve mechanisms active and operating. To meet torque requirements, the engine produces the same amount of torque on the active cylinders, such as by increasing an average load of each active cylinder compared to when every cylinder of engine 10 is active. This results in lowered pumping losses and increased engine efficiency. Also, the lower effective surface area (from only the enabled cylinders) exposed to combustion reduces engine heat losses, improving the thermal efficiency of engine 10.

Cylinders may be deactivated to provide a specific firing (or skip-fire) pattern based on a designated control algorithm. More specifically, selected "skipped" engine cycles are not fired while other "active" engine cycles are fired. Optionally, a spark timing associated with a selected firing of a selected active (e.g., enabled) cylinder may also be adjusted based on a firing order or firing history of the selected cylinder. Controller 12 may be configured with suitable logic, as described below with respect to FIG. 4, for determining a cylinder deactivation (or skip-firing) pattern based on engine operating conditions.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, such as where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from a fuel system 8. As elaborated with reference to FIGS. 2 and 3, fuel system 8 may include one or more fuel tanks, fuel pumps, and fuel rails. Fuel injector 166 is shown coupled directly to cylinder 14 for injecting fuel directly therein in proportion to a pulse width of a signal FPW-1 received from controller 12 via an electronic driver 168. In this manner, fuel injector 166 provides what is known as direct injection (hereafter referred to as "DI") of fuel into cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake passage 146, rather than directly coupled to cylinder 14, in a configuration that provides what is known as port injection of fuel (hereafter referred to as "PFI") into an intake port upstream of cylinder 14. Fuel injector 170 may inject fuel, received from fuel system 8, in proportion to a pulse width of a signal FPW-2 received from controller 12 via an electronic driver 171. Note that a single driver 168 or 171 may be used for both fuel injection systems, or multiple drivers, such as driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered to cylinder 14 by both injectors during a single cycle of the cylinder. For example, each injector may deliver a portion of a total fuel amount that is combusted in cylinder 14. Further, the distribution and/or relative amount of fuel delivered from each injector may vary with operating conditions, such as engine load, knock, and exhaust temperature, such as further described herein. The port injected fuel may be delivered during an open intake valve event, closed intake valve event (e.g., substantially before the intake stroke), as well as during both open and closed intake valve operation. Similarly, directly injected fuel may be delivered during an intake stroke, at least partly during a previous exhaust stroke, and at least partly during a compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, previous exhaust stroke, or any appropriate combination thereof.

Fuel injectors 166 and 170 may have different characteristics. These include differences in size, such as one injector having a larger injection hole than the other. Other differences include, but are not limited to, different spray angles, different operating temperatures, different targeting, different injection timing, different spray characteristics, different locations etc. Moreover, depending on a distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol contents, different water contents, different octane numbers, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including the signals previously discussed and additionally including a measurement of inducted mass air flow (MAF) from a mass air flow sensor 122; an engine coolant temperature (ECT) from a temperature sensor 116 coupled to a cooling sleeve 118; a profile ignition pickup signal (PIP) from a Hall effect sensor 120 (or other type) coupled to crankshaft 140; throttle position (TP) from the throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, upon receiving signals from various sensors, such as MAF from MAF sensor 122 and MAP from MAP sensor 124, controller 12 may transition the engine to operating in a rolling VDE mode, wherein one or more cylinders are deactivated in a selected pattern, as further described with respect to FIG. 4. In another example, based on signal PIP received from Hall effect sensor 120, among other signals, controller 12 may select between injecting fuel via one or more or each of fuel injector 166 and fuel injector 170, as further described with respect to FIG. 5.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Figure 2:
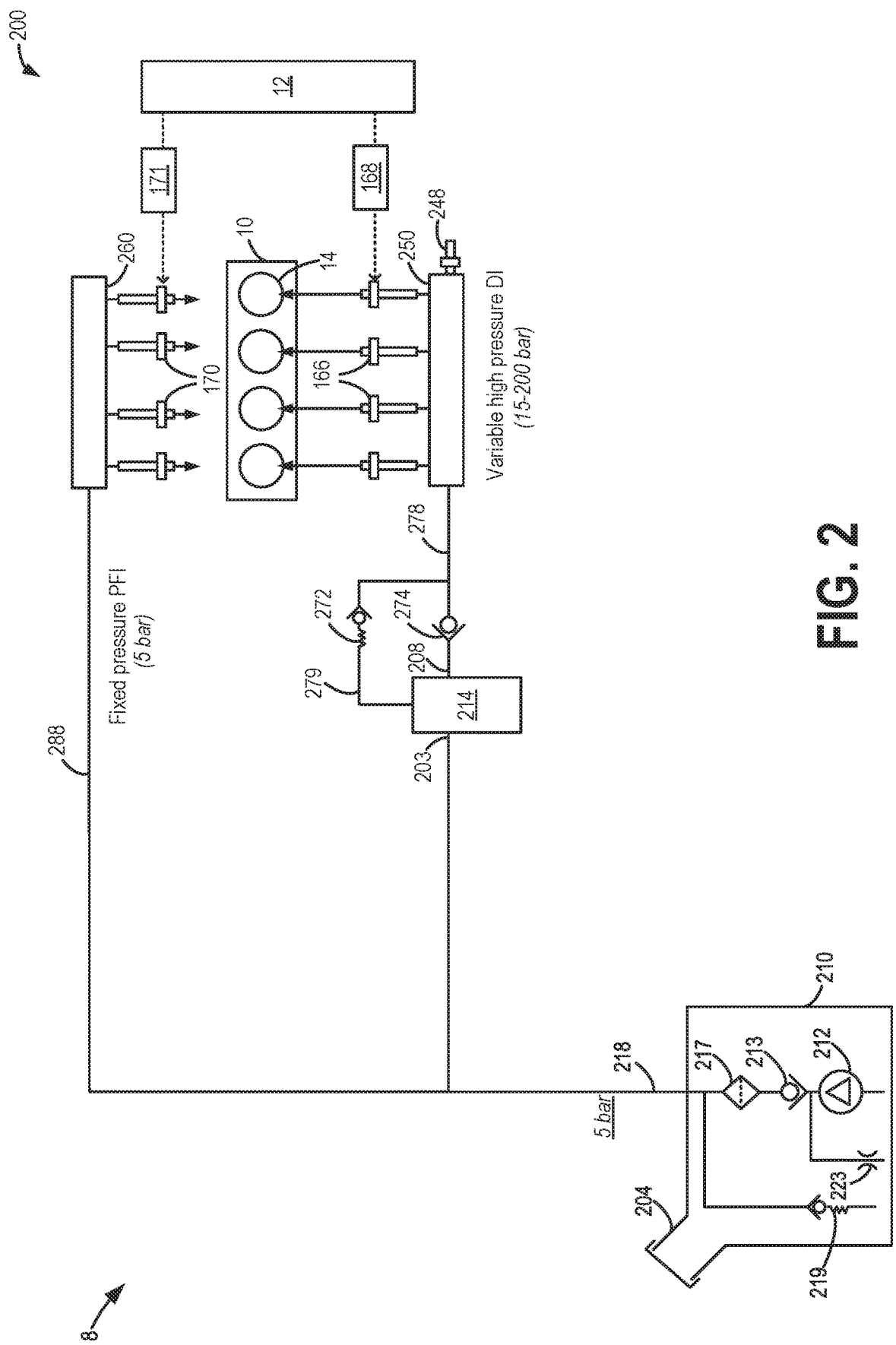
FIG. 2 schematically depicts a first example of a fuel system, configured for mechanically-regulated port injection and high pressure direct injection, that may be used with the engine of FIG. 1.
Figure 3:
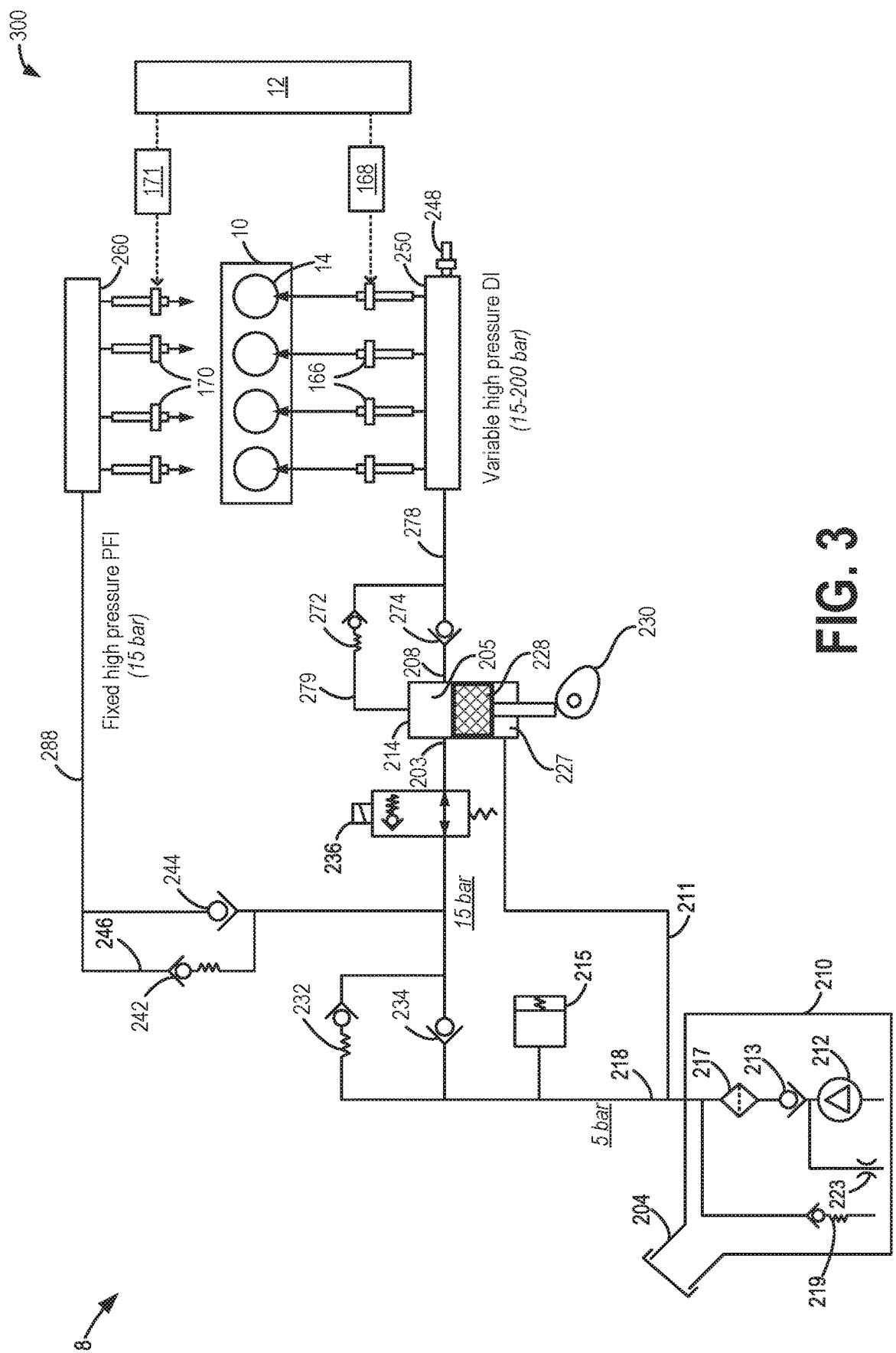
FIG. 3 schematically depicts a second example of a fuel system, configured for mechanically-regulated high pressure port injection and high pressure direct injection, that may be used with the engine of FIG. 1.

FIGS. 2 and 3 schematically depict examples of fuel system 8 introduced in FIG. 1, which may be operated to deliver fuel to an engine, such as engine 10, having a plurality of cylinders 14. As such, like components of FIGS. 1-3 are numbered the same and may not be reintroduced.

First, FIG. 2 shows a first example configuration 200 of fuel system 8. Fuel system 8 includes a fuel storage tank 210 for storing the fuel on-board the vehicle, a low pressure fuel pump (LPP) 212 (also referred to as a lift pump herein), and a high pressure fuel pump (HPP) 214 (also referred to as direct injection pump herein). Fuel may be provided to fuel tank 210 via fuel filling passage 204. In one example, LPP 212 may be an electrically-powered lower pressure fuel pump disposed at least partially within fuel tank 210. LPP 212 may be operated by controller 12 to provide fuel to HPP 214 via a low pressure fuel passage 218. As one example, LPP 212 may be a turbine (e.g., centrifugal) pump including an electric (e.g., DC) pump motor, whereby a pressure increase across the pump and/or a volumetric flow rate through the pump may be controlled by varying an amount of electrical power provided to the pump motor, thereby increasing or decreasing the motor speed. For example, as the controller reduces the electrical power provided to LPP 212, the volumetric flow rate and/or pressure increase across the lift pump may be reduced. The volumetric flow rate and/or pressure increase across the lift pump may be increased by increasing the electrical power provided to LPP 212. As one example, the electrical power supplied to the lift pump motor can be obtained from an alternator or other energy storage device on-board the vehicle, such as system battery 58 shown in FIG. 1, whereby controller 12 can control the electrical load that is used to power LPP 212. Thus, by varying the voltage and/or current provided to LPP 212, the flow rate and pressure of the fuel provided at the inlet of HPP 214 is adjusted, as further described below. Note that in other examples, a dedicated fuel controller that is communicatively coupled to controller 12 may be used to control one or more of LPP 212, HPP 214, electronic driver 168, and electronic driver 171.

LPP 212 may be fluidly coupled to a filter 217, which may remove small impurities contained in the fuel to prevent fuel system degradation. A check valve 213, which may facilitate fuel delivery and maintain fuel line pressure, may be positioned fluidly upstream of filter 217. With check valve 213 upstream of filter 217, a compliance of low pressure fuel passage 218 may be increased because the filter may be physically large in volume. Furthermore, a pressure relief valve 219 may be employed to limit the fuel pressure in low pressure fuel passage 218 (e.g., the output from LPP 212). Pressure relief valve 219 may include a ball and spring mechanism that seats and seals at a specified pressure differential, for example. The pressure differential setpoint at which pressure relief valve 219 is configured to open may be in a range of 5 bar to 6.4 bar, as a non-limiting example. An orifice 223 may be utilized to allow for air and/or fuel vapor to bleed out of the lift pump 212. The bleed at orifice 223 may also be used to power a jet pump used to transfer fuel from one location to another within fuel storage tank 210. In one example, an orifice check valve (not shown) may be placed in series with orifice 223. Furthermore, in some examples, configuration 200 may include one or more (e.g., a series) of check valves fluidly coupled to LPP 212 to impede fuel from leaking back upstream of the valves.

Fuel lifted by LPP 212 may be supplied at a lower pressure into low pressure fuel passage 218 leading to an inlet 203 of HPP 214. HPP 214 is coupled downstream of LPP 212 with no additional pump positioned in between. HPP 214 may then deliver fuel into a first fuel rail 250 coupled to one or more direct injectors 166 (herein also referred to as a first injector group). Fuel lifted by LPP 212 may also be supplied to a second fuel rail 260 coupled to one or more port injectors 170 (herein also referred to as a second injector group). HPP 214 may be operated to raise the pressure of fuel delivered to first (e.g., DI) fuel rail 250 above the lift pump pressure such that first fuel rail 250 may be operated at a variable high pressure (such as in a range from 15 to 200 bar, for example). Thus, first fuel rail 250 is coupled to each of HPP 214 and LPP 212. HPP 214 may be an engine-driven (e.g., mechanically driven), positive-displacement pump in contrast to the motor-driven LPP 212. In the example of configuration 200, second fuel rail 260 is coupled exclusively to LPP 212 via a fuel passage 288, and second fuel rail 260 is operated at the lift pump pressure. However, in other configurations, such as elaborated below with respect to FIG. 3, HPP 214 may be operated to raise the pressure of fuel delivered to each of the first and second fuel rails above the lift pump pressure.

While four direct injectors 166 are shown, any suitable number of direct injectors 166 may be included. Similarly, while four port injectors 170 are shown, any suitable number of port injectors 170 may be included. As one example, first fuel rail 250 may dispense fuel to one fuel injector of first injector group 166 for each cylinder of the engine while second fuel rail 260 may dispense fuel to one fuel injector of second injector group 170 for each cylinder of the engine. Controller 12 can individually actuate each of the port injectors 170 via the port injection electronic driver 171 and actuate each of the direct injectors 166 via the direct injection electronic driver 168. Controller 12, electronic drivers 171 and 168, and other suitable engine system controllers may comprise a fuel control system, for example. While the electronic drivers 171 and 168 are shown external to controller 12, it should be appreciated that in other examples, the controller 12 may include electronic drivers 171 and 168 within a housing of the controller or can be configured to provide the functionality of the electronic drivers 171 and 168.

First fuel rail 250 includes a first fuel rail pressure sensor 248 for providing an indication of direct injection fuel rail pressure to the controller 12. In the example shown in FIG. 2, second fuel rail 260 does not include a fuel rail pressure sensor for providing an indication of port injection fuel rail pressure to the controller 12. As described further herein, second fuel rail 260 may be operated at a mechanically limited, fixed pressure.

First fuel rail 250 is coupled to an outlet 208 of HPP 214 along a fuel passage 278. An outlet check valve 274 and a pressure relief valve 272 may be positioned between the outlet 208 of HPP 214 and first fuel rail 250. Pressure relief valve 272, arranged parallel to outlet check valve 274 in a bypass passage 279, may limit the pressure in fuel passage 278 downstream of HPP 214 and upstream of first fuel rail 250. In one non-limiting example, pressure relief valve 272 may limit the pressure in fuel passage 278 (and first fuel rail 250) to 200 bar. As such, pressure relief valve 272 may limit the pressure that would otherwise be generated in fuel passage 278 while high pressure fuel pump 214 is pumping. Furthermore, outlet check valve 274 of HPP 214 is mechanically controlled and not electronically controlled by an external controller.

In some examples, controller 12 may be configured to regulate fuel flow into HPP 214 through a solenoid activated control valve, as will be further described below with respect to FIG. 3. It is noted here that HPP 214 of FIG. 2 is presented as an illustrative example of one possible configuration for a high pressure fuel pump. Components shown in FIG. 2 may be removed and/or changed while additional components not presently shown may be added to HPP 214 while still maintaining the ability to deliver high pressure fuel to a direct injection fuel rail. For example, HPP 214 may additionally include some of the components described below with respect to FIG. 3.

Controller 12 can also control the operation of each of LPP 212 and HPP 214 to adjust an amount, pressure, flow rate, etc. of a fuel delivered to the engine. As one example, controller 12 can vary a pressure setting, a pump stroke amount, a pump duty cycle command, and/or a fuel flow rate of each of the fuel pumps to deliver fuel to different locations of the fuel system. A driver (not shown) electronically coupled to controller 12, may be used to send a control signal to LPP 212, as required, to adjust the output of LPP 212. As an example, controller 12 may be configured to regulate a pressure of fuel at inlet 203 by adjusting an output of LPP 212.

As mentioned above, LPP 212 may be used for supplying fuel to second fuel rail 260 during port fuel injection and to HPP 214 during direct injection of fuel. In one example, during port fuel injection (e.g., during PFI-only operation or PFI+DI operation), controller 12 may control LPP 212 to operate in a continuous mode to supply fuel at a constant fuel pressure to second fuel rail 260 so as to maintain a relatively constant port fuel injection pressure. The constant full pressure may be mechanically regulated by pressure relief valve 219. During direct injection of fuel when port fuel injection is OFF and deactivated (e.g., during DI-only operation), controller 12 may control LPP 212 to supply fuel to the HPP 214. During DI-only operation, LPP 212 operation may be varied using feedback on a volumetric efficiency of HPP 214. In some examples, LPP 212 may be operated in a pulsed mode during DI-only operation, where LPP 212 is alternately switched ON and OFF based on fuel pressure readings from pressure sensor 248 coupled to first fuel rail 250, thereby reducing power consumption of LPP 212. In other examples, in the pulsed mode, LPP 212 may be activated (as in, turned ON) but may be set at zero voltage. As such, this setting for LPP 212 may effectively ensure lower energy consumption by LPP 212 while providing a faster response time when LPP 212 is actuated. When low pressure pump operation is desired, voltage supplied to LPP 212 may be increased from zero voltage to enable pump operation. Thus, LPP 212 may be pulsed from a zero voltage to a non-zero voltage. In one example, LPP 212 may be pulsed from zero voltage to full voltage. In another example, LPP 212 may be pulsed for short intervals such as 50 to 250 milliseconds at a non-zero voltage. The non-zero voltage may be determined based on a duration of the pulse and the interval between each pulse. In still another example, LPP 212 may be operated in the continuous mode during DI-only operation, with the amount of non-zero voltage supplied to LPP 212 varied to provide a lowest pressure at inlet 203 of HPP 214 without volumetric efficiency loss. The control of LPP 212 during both PFI and DI operation is further described with respect to FIG. 5.

FIG. 3 schematically depicts a second example configuration 300 of fuel system 8 introduced in FIG. 1. Configuration 300 of FIG. 3 may include additional components (e.g., in addition to the components previously described with respect to FIG. 2) that enable high pressure port fuel injection to be performed. For example, as elaborated below, HPP 214 may be operated to raise the pressure of fuel delivered to each of the first and second fuel rails above the lift pump pressure, with first (e.g., DI) fuel rail 250 operating at a variable high pressure (such as in a range from 15 to 200 bar, for example) while second (e.g., PFI) fuel rail 260 operates at a fixed high pressure (such as at 15 bar, as a non-limiting example). As a result, high pressure port and direct injection may be enabled.

As shown in FIG. 3, as one non-limiting example, HPP 214 may utilize a solenoid activated control valve 236 (e.g., fuel volume regulator, magnetic solenoid valve, etc.) to vary an effective pump volume of each pump stroke. HPP 214 includes a pump piston 228, a pump compression chamber 205, and a step-room 227. Pump piston 228 receives a mechanical input from the engine crankshaft or camshaft via a cam 230, thereby operating the HPP according to the principle of a cam-driven single-cylinder pump, and reciprocates up and down. HPP 214 is in a compression stroke when piston 228 is traveling in a direction that reduces the volume of compression chamber 205. HPP 214 is in a suction stroke when piston 228 is traveling in a direction that increases the volume of compression chamber 205. A sensor (not shown in FIG. 3) may be positioned near cam 230 to enable determination of the angular position of the cam (e.g., between 0 and 360 degrees), which may be relayed to controller 12. An engine speed sensor, such as Hall effect sensor 120 shown in FIG. 1, can be used to provide an indication of engine speed to controller 12. The indication of engine speed can be used to identify the speed of HPP 214 since HPP 214 is mechanically driven by engine 10.

Fuel system 8 may optionally further include an accumulator 215. When included, accumulator 215 may be positioned downstream of LPP 212 and upstream of HPP 214 and may be configured to hold a volume of fuel that reduces the rate of fuel pressure increase or decrease between LPP 212 and HPP 214. For example, accumulator 215 may be coupled in low pressure fuel passage 218, as shown, or in a bypass passage 211 coupling low pressure fuel passage 218 to the step-room 227 of HPP 214. The volume of accumulator 215 may be sized such that the engine can operate at idle conditions for a predetermined period of time between operating intervals of LPP 212. For example, accumulator 215 can be sized such that when the engine idles, it takes one or more minutes to deplete pressure in the accumulator to a level at which HPP 214 is incapable of maintaining a sufficiently high fuel pressure for fuel injectors 166 and 170. Accumulator 215 may thus enable an intermittent operation mode (or pulsed mode) of LPP 212. By reducing the frequency of LPP 212 operation, power consumption is reduced. In other examples, accumulator 215 may inherently exist in the compliance of fuel filter 217 and low pressure fuel passage 218, and thus may not exist as a distinct element.

First fuel rail 250 is coupled to outlet 208 of HPP 214 along a fuel passage 278, as in configuration 200 of FIG. 2. In contrast to configuration 200 shown in FIG. 2, in configuration 300 shown in FIG. 3, second fuel rail 260 is coupled to inlet 203 of HPP 214 via fuel passage 288. As such, the specific configuration of the fuel system shown in FIG. 3 enables the pressure at second fuel rail 260 to be raised via HPP 214 to a fixed, default pressure that is above the default pressure of LPP 214, as elaborated below. That is, the fixed, high pressure at second fuel rail 260 is derived from HPP 214 operation.

One or more check valves and pressure relief valves may also be coupled to low pressure fuel passage 218 downstream of LPP 212 and upstream of HPP 214. For example, a check valve 234 may be provided in low pressure fuel passage 218 to reduce or prevent back-flow of fuel from HPP 214 to LPP 212 and fuel tank 210. In addition, a pressure relief valve 232 may be provided in a bypass passage positioned parallel to check valve 234. Pressure relief valve 232 may limit the pressure upstream of check valve 234 to 15 bar, as one non-limiting example.

Controller 12 may be configured to regulate fuel flow into HPP 214 through solenoid activated control valve 236 by energizing or de-energizing the solenoid valve (based on the solenoid valve configuration) in synchronism with cam 230. Accordingly, solenoid activated control valve 236 may be operated in a first mode where solenoid activated control valve 236 is positioned within HPP inlet 203 to limit (e.g., inhibit) the amount of fuel traveling through the solenoid activated control valve 236. Depending on the timing of the solenoid valve actuation, the volume transferred to first fuel rail 250 is varied. Solenoid activated control valve 236 may also be operated in a second mode where solenoid activated control valve 236 is effectively disabled, and fuel can travel upstream and downstream of the valve, and in and out of HPP 214. As such, solenoid activated control valve 236 may be configured to regulate a mass (or volume) of fuel compressed into HPP 214. In one example, controller 12 may adjust a closing timing of the solenoid activated control valve 236 to regulate the mass of fuel compressed. For example, a late pressure control valve closing may increase the mass of fuel ingested into compression chamber 205. The opening and closing timings of solenoid activated control valve 236 may be coordinated with respect to stroke timings of HPP 214.

Pressure relief valve 232 allows fuel flow out of solenoid activated control valve 236 toward LPP 212 when a pressure between pressure relief valve 232 and solenoid operated control valve 236 is greater than a predetermined pressure (e.g., 15 bar). When solenoid operated control valve 236 is deactivated (e.g., not electrically energized), solenoid activated control valve 236 operates in a pass-through mode, and pressure relief valve 232 regulates pressure at compression chamber 205 to the single pressure relief set-point of pressure relief valve 232 (e.g., 10 bar). That is, the pressure at inlet 203 is the sum of the pressure relief setting of in-tank pressure relief valve 219 and the pressure relief setting of pressure relief valve 232 when solenoid activated check valve 236 is in a default position and piston 228 is on the upstroke. Thus, during conditions when direct injection fuel pump operation is not requested, controller 12 may deactivate solenoid activated control valve 236, and pressure relief valve 232 regulates pressure in compression chamber 205 to a single substantially constant pressure during most of the compression stroke. As a result, first fuel rail 250 is regulated to a minimum pressure, which is approximately the pressure relief of pressure relief valve 232.

Solenoid activated control valve 236 may also be operated to direct fuel back-flow from HPP 214 to one of pressure relief valve 232 and accumulator 215. For example, solenoid activated control valve 236 may be operated to generate and store fuel pressure in accumulator 215 for later use. One use of accumulator 215 is to absorb fuel volume flow that results from the opening of pressure relief valve 232. Accumulator 215 sources fuel as check valve 234 opens during the intake stroke of HPP 214. Another use of accumulator 215 is to absorb/source the volume changes in the step room 227. Yet another use of accumulator 215 is to allow intermittent operation of LPP 212 to gain an average pump input power reduction over continuous operation.

Regulating the pressure in compression chamber 205 allows a pressure differential to form from the piston top to the piston bottom. The pressure in step-room 227 is at the pressure of the outlet of the low pressure pump (e.g., 5 bar) while the pressure at piston top is at the relief set-point of pressure relief valve 232 (e.g., 15 bar). The pressure differential allows fuel to seep from the piston top to the piston bottom through the clearance between the piston and the pump cylinder wall, thereby lubricating HPP 214. Thus, during at least the compression stroke of direct injection fuel pump 214, lubrication is provided to the pump. As such, while piston 228 of HPP 214 is reciprocating, the flow of fuel between the piston and bore ensures sufficient pump lubrication and cooling.

Outlet check valve 274, coupled downstream of outlet 208 of compression chamber 205, is a forward flow check valve. Outlet check valve 274 opens to allow fuel to flow from the high pressure pump outlet 208 into first fuel rail 250 when a pressure at the outlet 208 (e.g., a compression chamber outlet pressure) is higher than the pressure of first fuel rail 250. On the suction (e.g., intake) stroke, the pressure in compression chamber 205 drops to a pressure near the pressure of LPP 212. When direct fuel injection pump enters a suction stroke, fuel pressure in the compression chamber may be reduced while still some level of lubrication may be provided as long as the pressure differential remains. Pressure relief valve 272 may be placed in parallel with outlet check valve 274. Pressure relief valve 272 allows fuel flow out of first fuel rail 250 to HPP 214 when the fuel rail pressure is greater than a predetermined pressure.

It is noted here that HPP 214 of FIG. 3 is presented as an illustrative example of one possible configuration for a high pressure fuel pump. Components shown in FIG. 3 may be removed and/or changed while additional components not presently shown may be added to HPP 214 while still maintaining the ability to deliver high pressure fuel to a direct injection fuel rail and, in some examples, additionally a port injection fuel rail.

While first, direct injection fuel rail 250 is coupled to the outlet 208 of HPP 214 (and not to the inlet of HPP 214), second, port injection fuel rail 260 is coupled to the inlet 203 of HPP 214 (and not to the outlet of HPP 214). Although inlets, outlets, and the like relative to compression chamber 205 are described herein, it may be appreciated that there may be a single conduit into compression chamber 205. The single conduit may serve as inlet and outlet. In particular, second fuel rail 260 is coupled to HPP inlet 203 at a location upstream of solenoid activated control valve 236 and downstream of check valve 234 and pressure relief valve 232. Further, no additional pump may be present between LPP 212 and the second fuel rail 260. As elaborated below, the specific configuration of the fuel system shown in FIG. 3 with second fuel rail 260 coupled to inlet 203 of HPP 214 via a pressure relief valve 242 (located in a bypass passage 246) and a check valve 244 enables the pressure at second fuel rail 260 to be raised via HPP 214 to a fixed, default pressure that is above the default pressure of LPP 212. That is, the fixed, high pressure at second fuel rail 260 is derived from HPP 214 operation.

When HPP 214 is not reciprocating, such as at key-up before cranking, check valve 244 allows the second fuel rail to fill at the output pressure of LPP 212 (e.g., 5 bar). As the pump compression chamber 205 displacement becomes smaller due to piston 228 moving upward, the fuel flows in one of two directions. If solenoid activated control valve 236 is closed, the fuel goes into first fuel rail 250. If solenoid activated control valve 236 is open, the fuel goes either into second fuel rail 260 or through pressure relief valve 232. In this way, the HPP 214 is operated to deliver fuel at a variable high pressure (such as between 15-200 bar) to the direct fuel injectors 166 via the first fuel rail 250 while also delivering fuel at a fixed high pressure (such as at 15 bar) to the port fuel injectors 170 via the second fuel rail 260. The variable pressure may include a minimum pressure that is at the fixed pressure (as in the system of FIG. 3). In the configuration depicted at FIG. 3, the fixed pressure of second fuel rail 260 (the port injection fuel rail) is the same as the minimum pressure of first fuel rail 250 (the direct injection fuel rail), both being higher than a maximum pressure output by LPP 212. Herein, the fuel delivery from HPP 214 is controlled via the upstream solenoid activated control valve 236 and further via the various check valves and pressure relief valves coupled to the inlet 203 of HPP 214. By adjusting operation of solenoid activated control valve 236, the fuel pressure at first fuel rail 250 is raised from the fixed pressure to the variable pressure while maintaining the fixed pressure at second fuel rail 260. Furthermore, check valve 244 and pressure relief valve 242 work in combination to keep the second fuel rail 260 pressurized (e.g., to 15 bar) during the suction stroke of HPP 214.

As mentioned above and described with respect to FIG. 2, LPP 212 may be used for supplying fuel to second fuel rail 260 during port fuel injection and to HPP 214 during direct injection of fuel. In one example, during port fuel injection (e.g., during PFI-only operation or PFI+DI operation), controller 12 may control LPP 212 to operate in a continuous mode to supply fuel at a constant fuel pressure to second fuel rail 260 so as to maintain a relatively constant port fuel injection pressure. During direct injection of fuel when port fuel injection is OFF and deactivated (e.g., during DI-only operation), controller 12 may control LPP 212 to supply fuel to the HPP 214. During DI-only operation, LPP 212 operation may be varied using feedback on a volumetric efficiency of HPP 214. In some examples, LPP 212 may be operated in a pulsed mode during DI-only operation, where LPP 212 is alternately switched ON and OFF based on fuel pressure readings from pressure sensor 248 coupled to first fuel rail 250, thereby reducing power consumption of LPP 212. In other examples, in the pulsed mode, LPP 212 may be activated (as in, turned ON) but may be set at zero voltage. As such, this setting for LPP 212 may effectively ensure lower energy consumption by LPP 212 while providing a faster response time when LPP 212 is actuated. When low pressure pump operation is desired, voltage supplied to LPP 212 may be increased from zero voltage to enable pump operation. Thus, LPP 212 may be pulsed from a zero voltage to a non-zero voltage. In one example, LPP 212 may be pulsed from zero voltage to full voltage. In another example, LPP 212 may be pulsed for short intervals such as 50 to 250 milliseconds at a non-zero voltage. The non-zero voltage may be determined based on a duration of the pulse and the interval between each pulse. In still another example, LPP 212 may be operated in the continuous mode during DI-only operation, with the amount of non-zero voltage supplied to LPP 212 varied to provide a lowest pressure at inlet 203 of HPP 214 without volumetric efficiency loss. In still other examples, in contrast to configuration 200 of FIG. 2 in which LPP 212 may be operated in a pulsed mode only during DI-only operation, in configuration 300 shown in FIG. 3, LPP 212 may be operated in a pulsed mode during both PFI and DI operations to benefit from reduced power consumption of the lift pump when operated in the pulsed mode. As such, LPP 212 may be pulsed without feedback (e.g., using open loop control), similar to LPP operation in continuous mode (with continuous voltage supply at a non-zero voltage). The pulsed mode of operation may effectively consume significantly less power than the continuous mode. The control of LPP 212 during both PFI and DI operation is further described with respect to FIG. 5.

Although LPP 212 may be operated with higher power consumption using open loop pump control and mechanical pressure regulation during PFI operation, in an engine equipped with rVDE technology, such as engine 10, the PFI system may be rarely used (e.g., for less than 5 or 10% of fuel delivery). Thus, the deletion of pressure sensors on the lower pressure side of fuel system 8, including second fuel rail 260, may enable significant cost savings that outweigh the higher electrical power consumption of controlling the PFI system via mechanical pressure regulation. For example, the PFI system may not factor into fuel economy assessments, as the controller 12 may instead switch to a VDE mode of operation during conditions when PFI would have fuel economy benefits over DI.

Figure 4:
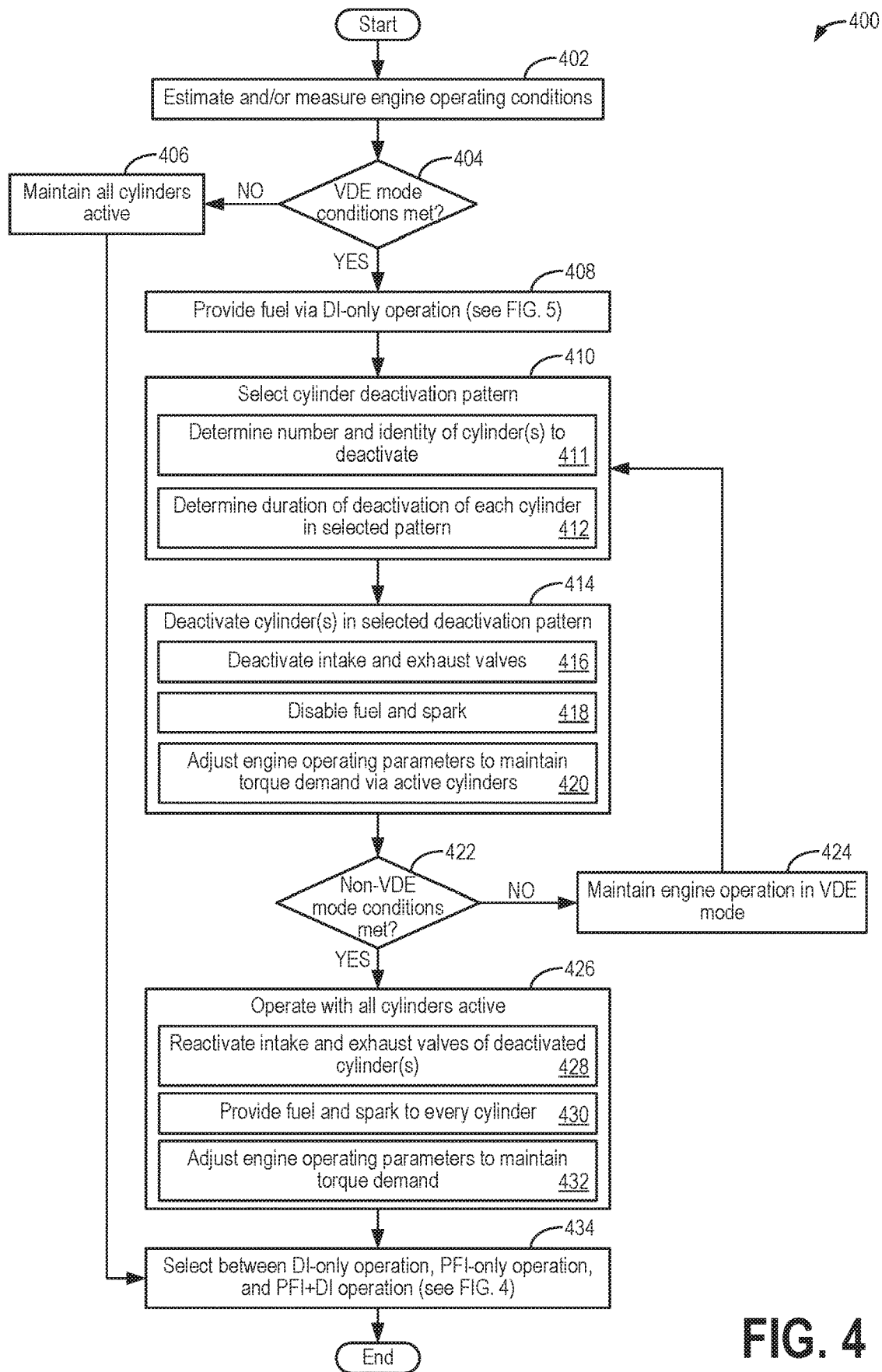
FIG. 4 depicts a flow chart of a method for controlling operation of a rolling variable displacement engine.

FIG. 4 shows and example method 400 for adjusting operation of a rolling variable displacement engine having a PFDI fuel system, such as engine 10 and fuel system 8 shown in FIGS. 1-3. For example, engine displacement and fuel system operation may be optimized based on operating conditions in order to increase engine efficiency and fuel economy. Therefore, the engine may be transitioned between a VDE mode of operation, in which one or more cylinders is deactivated, and a non-VDE mode of operation, in which every cylinder is active and operating, multiple times within a drive cycle (e.g., between a vehicle key-on event and key-off event). Furthermore, the fuel system may be transitioned between DI-only operation, PFI-only operation, and PFI and DI (e.g., PFI+DI) operation multiple times within the drive cycle, as will be further elaborated with respect to FIG. 5. Instructions for carrying out method 400 and the rest of the methods included herein may be executed by a controller (e.g., controller 12 shown in FIG. 1) based on instructions stored on a memory of the controller and in conjunction with signals received from sensors of the engine system, such as the sensors described above with reference to FIG. 1. The controller may employ engine actuators of the engine system (e.g., direct fuel injector 166, port fuel injector 170, intake valve actuator 152, and exhaust valve actuator 154 of FIG. 1) to adjust engine operation according to the methods described below.

Method 400 begins at 402 and includes estimating and/or measuring engine operating conditions. Operating conditions may include, but are not limited to, engine speed, engine load, manifold pressure, engine temperature, torque demand, a temperature of a catalyst (e.g., emission control device 178 of FIG. 1), ambient conditions (such as ambient temperature, pressure, and humidity), etc. For example, the engine speed may be determined from a signal PIP output by an engine speed sensor (e.g., Hall effect sensor 120 of FIG. 1), the engine load may be determined from a signal MAF output by a MAF sensor (e.g., MAF sensor 122 of FIG. 1), the manifold pressure may be determined from a signal MAP output by a MAP sensor (e.g., MAP sensor 124 of FIG. 1), and the torque demand may be determined from a signal PP output by a pedal position sensor (e.g., pedal position sensor 134 of FIG. 1). As one example, the engine temperature may be directly determined based on an output of an engine coolant temperature sensor (e.g., signal ECT from engine coolant temperature sensor 116 shown in FIG. 1). As another example, the engine temperature may be directly determined based on an output of a cylinder head temperature sensor.

At 404, it is determined if conditions for operating in the VDE mode are met, such as when the operating conditions enable the engine to be operated with one or more cylinders selectively deactivated. In one example, VDE mode entry conditions may be met if the torque demand, or engine load, is below a threshold. Further, operation in the VDE mode may be enabled only if the engine coolant temperature is above a threshold to preempt cold cylinder related issues, which may result in higher particulate matter generation.

If the conditions for operating in the VDE mode are not met, method 400 proceeds to 406 and includes maintaining all cylinders active. Thereby, all of the engine cylinders will combust fuel and produce torque. Method 400 may then proceed to 434, as will be described below. If the VDE mode conditions are met, method 400 proceeds to 408 and includes providing fuel via DI-only operation, as will be further described with respect to FIG. 5. For example, while operating in the VDE mode, each active cylinder operates at a higher average engine load in order to maintain a demanded torque. Therefore, fuel may be delivered via direct injection only due to the favorable effect of DI on engine performance and fuel economy, and port fuel injectors (e.g., port fuel injectors 170 of FIGS. 1 and 2) may be disabled.

At 410, method 400 includes selecting a cylinder deactivation pattern. The cylinder deactivation pattern may be selected based on torque demand in order to maintain vehicle operability and driveability, as the remaining fueled cylinders provide all of the engine torque. Further, the cylinder deactivation pattern may be selected in order to mitigate engine noise, vibration, and harshness (NVH) depending on a configuration of the engine (e.g., a layout and a total number of cylinders). Selecting the cylinder deactivation pattern includes determining a number and identity of cylinder(s) to deactivate, as indicated at 411. In one example, the number of cylinders to be deactivated may increase as the driver torque demand decreases. In still other examples, the controller may determine a desired induction ratio (a total number of cylinder firing events divided by a total number of cylinder compression strokes) based at least on torque demand. The controller may determine the number of cylinders to deactivate (or the desired induction ratio) by inputting the operating conditions, such as one or more of the torque demand and the engine load, into one or more look-up tables, maps, or algorithms and outputting the number of cylinders to deactivate for the given conditions. As an example, the pattern for an induction ratio of 0.5 may include every other cylinder being fired (wherein combustion is carried out within the cylinder, with intake and exhaust valves opening and closing during a cycle of the cylinder) or unfired (wherein fueling is disabled and combustion does not occur). Selecting the cylinder deactivation pattern further includes determining a duration of deactivation of each cylinder in the selected pattern, as indicated at 412. For example, the controller may determine a number of combustion events or engine cycles over which to maintain the selected cylinders deactivated. In some examples, the same pattern may be applied for each consecutive engine cycle such that the same cylinders are unfired (e.g., skipped) on consecutive engine cycles while the remaining cylinders are fired on each of the engine cycles. In other examples, different cylinders may be unfired on each engine cycle such that the firing and unfiring is cycled or distributed uniformly amongst the engine cylinders. Furthermore, in some examples, the same set of cylinders may be selected for deactivation each time cylinder deactivation conditions are met, while in other examples, the identity of the deactivated cylinders may be varied each time cylinder deactivation conditions are met.

At 414, method 400 includes deactivating the cylinder(s) in the selected deactivation pattern. Deactivating the cylinder(s) in the selected deactivation pattern includes deactivating intake and exhaust valves of the corresponding cylinders, as indicated at 416. For example, each corresponding intake and exhaust valve may be deactivated (and reactivated) according to the selected deactivation pattern via an actuator (e.g., intake valve actuator 152 and exhaust valve actuator 154 of FIG. 1, respectively). Deactivating the cylinder(s) in the selected deactivation pattern further includes disabling fuel and spark in the corresponding cylinders, as indicated at 418. For example, with the port fuel injectors already disabled, the direct injector of each cylinder in the selected pattern may be disabled for the determined duration so that fuel is not injected into a cylinder while it is deactivated. Spark may also be disabled in the corresponding cylinders, such as by not actuating a spark plug coupled to each cylinder (e.g., spark plug 192 of FIG. 1). However, in other examples, spark may not be disabled, as providing spark in the absence of fuel will not result in combustion.

Therefore, deactivating the cylinder(s) in the selected deactivation pattern includes, for the determined number and identity of cylinders, holding the cylinder valves closed, with no fuel injected into the cylinders, for at least an entire engine cycle of 720 crank angle degrees (that is, for all four strokes of a cylinder). Using a four-cylinder engine as an example, when the determined number of cylinders is two (or the induction ratio is 0.5) and the selected pattern varies the identities of the deactivated cylinders each engine cycle, fuel injection to a first set of two cylinders may be disabled and the intake and exhaust valves of the first set of two cylinders deactivated during a first engine cycle while combustion continues in a second set of two cylinders. Then, the fuel injection to the second set of two cylinders may be disabled and the intake and exhaust valves of the second set of two cylinders deactivated during a second engine cycle while the first set of two cylinders are fueled (e.g., via DI) and their intake and exhaust valves reactivated. Then, the fuel injection to the first set of two cylinders may again be disabled and their intake and exhaust valves deactivated during a third engine cycle, etc.

Additionally, deactivating the cylinder(s) in the selected deactivation pattern includes adjusting engine operating parameters to maintain the torque demand via the (remaining) active cylinders, as indicated at 420. For example, one or more of airflow, spark timing, and cylinder valve timing may be adjusted in the active cylinders in order to maintain the engine torque demand and minimize torque disturbances. As such, the engine may be operated with a subset of cylinders deactivated in the selected pattern while a remaining number of active cylinders provide all of the torque demand.

At 422, it is determined if conditions for operating in the non-VDE mode are met. For example, the controller may determine if engine operating conditions have changed to warrant exit from the VDE mode of operation and entry into the non-VDE mode of operation where the engine can be operated with all cylinders active. In one example, non-VDE mode entry conditions (or VDE mode exit conditions) may be met if the torque demand, or the vehicle speed, is above a threshold.

If conditions for operating in the non-VDE mode are not met, method 400 proceeds to 424 and includes maintaining engine operation in the VDE mode. Furthermore, the selected cylinder deactivation pattern may be varied, such as by returning to 410, as operating conditions within the VDE mode change. In this way, the controller may adjust the number and identity of deactivated cylinders in order to meet the driver-demanded torque while optimizing fuel economy.

If conditions for operating in the non-VDE mode are met, method 400 proceeds to 426 and includes operating will all cylinders active. For example, the engine may be transitioned from the VDE mode to the non-VDE mode by reactivating the intake and exhaust valves of the currently deactivated cylinder(s), as indicated at 428. For example, the controller may reactivate the intake and exhaust valves of the currently deactivated cylinder(s) by sending control signals the corresponding valve actuators at the appropriate valve timing. Operating with all of the cylinders active further includes providing fuel and spark to every cylinder, as indicated at 430. As such, combustion may occur in every cylinder of the engine according to a known firing order. Transitioning to operating with all of the cylinders active additionally includes adjusting engine operating parameters to maintain the torque demand, as indicated at 432. With combustion resumed in all of the engine cylinders, one or more of airflow, spark timing, and cylinder valve timing may be adjusted in order to maintain the engine torque demand and minimize torque disturbances, for example.

Figure 5:
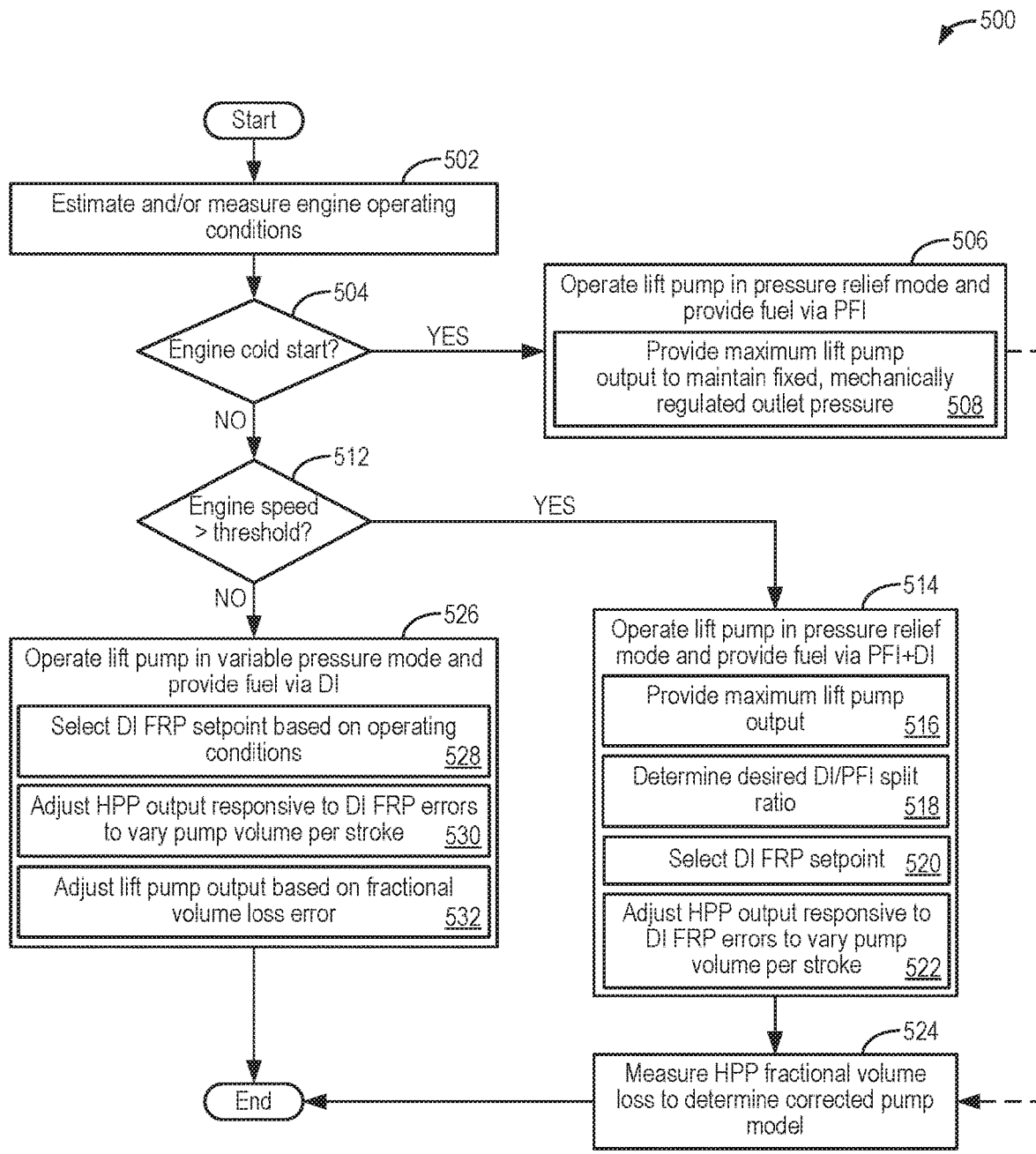
FIG. 5 shows a flow chart of a method for controlling PFDI fuel system operation based on operating conditions.
Figure 6:
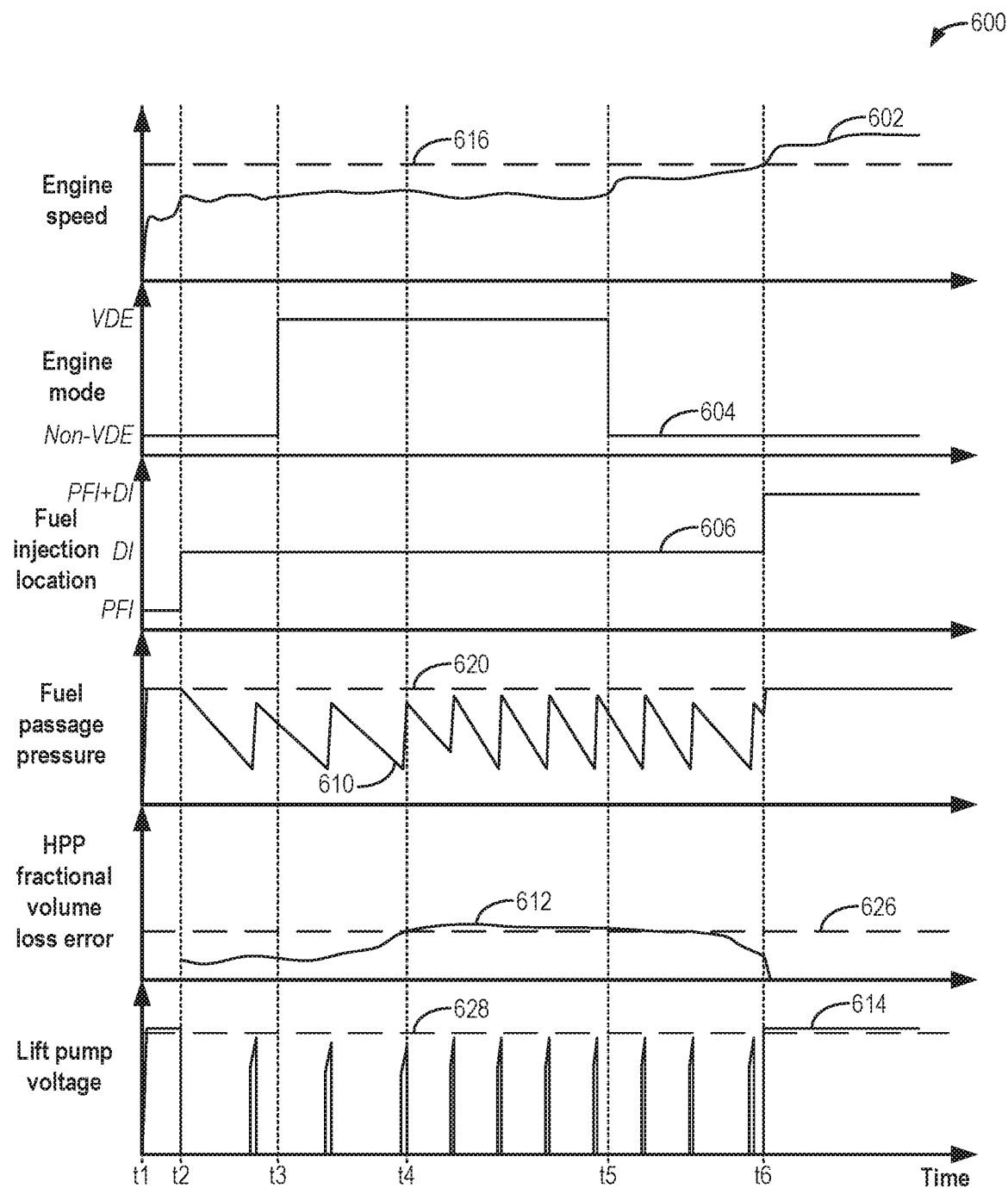
FIG. 6 is a prophetic example timeline of controlling a PFDI fuel system of a rVDE engine.

At 434, method 400 includes selecting between DI-only operation, PFI-only operation, and PFI+DI operation, as will be further described with respect to FIG. 5. For example, due to the rVDE technology enabling fuel economy savings, PFI may not be used for fuel economy at lower engine loads but may be used during an engine start to facilitate fuel vaporization and mixture preparation. PFI+DI operation may be selected at higher engine speeds for increased engine performance. DI-only operation may be selected at all other operating conditions while operating in the non-VDE mode (as well as while operating in the VDE mode, as at 408). In particular, selecting between DI-only operation, PFI-only operation, and PFI+DI operation may not only determine the injectors through which fuel is delivered, but how a fuel lift pump (e.g., LPP 212) is operated. While operating with PFI (e.g., during both PFI-only operation and PFI+DI operation), the lift pump may be operated in a pressure relief mode in which the lift pump is controlled to output fuel at a mechanically limited pressure, maintained by a pressure relief valve, in order to operate the PFI system without pressure feedback. While operating with DI-only, the lift pump may be controlled to output fuel at a pressure lower than the mechanically limited pressure in order to reduce electrical power consumption. Following 434, method 400 ends.

In this way, by transitioning the engine between operating in a VDE mode, in which one or more cylinders is selectively deactivated and does not undergo combustion, and a non-VDE mode, in which every cylinder is active and combusting fuel and air, fuel economy may be increased. Furthermore, by providing fuel via DI-only during the VDE mode, electrical power consumption may be reduced, as further described below.

FIG. 5 shows an example method 500 for controlling operation of a PDFI fuel system of a rVDE engine. At least parts of method 500 apply to both the first example configuration 200 of fuel system 8 shown in FIG. 2 and the second example configuration 300 of fuel system 8 shown in FIG. 3. More specifically, a fuel lift pump (e.g., LPP 212 of FIGS. 2-3) may be configured to deliver fuel to both a high pressure fuel pump (e.g., HPP 214 of FIGS. 2-3) and a port fuel injection fuel rail (e.g., second fuel rail 260 of FIGS. 2-3). The lift pump may be operated differently (e.g., by a controller, such as controller 12 shown in FIGS. 1-3) based on whether PFI, DI, or both is desired. In some examples, method 500 may be performed as a part of method 400 of FIG. 4 (e.g., at 434). In other examples, method 500 may be performed any time fuel delivery is desired, such as when the engine is combusting fuel within engine cylinders.

Method 500 begins at 502 and includes estimating and/or measuring operating conditions. Operating conditions may include, for example, ambient temperature, manifold pressure, throttle position (e.g., from signal TP output by a throttle position sensor), accelerator pedal position (e.g., signal PP output by a pedal position sensor), engine temperature (e.g., as estimated from an output of an engine coolant temperature sensor, such as engine coolant temperature sensor 116 of FIG. 1), a temperature of a catalyst (e.g., emission control device 178 of FIG. 1), a state of the engine, and an ignition state of the vehicle. The state of the engine may refer to whether the engine is on (e.g., operating at a non-zero speed, with combustion occurring within engine cylinders) or off (e.g., at rest, without combustion occurring in the engine cylinders). The ignition state of the vehicle may refer to a position of an ignition switch. As an example, the ignition switch may be in an "off" position, indicating that the vehicle is off (e.g., powered down, with a vehicle speed of zero), or in an "on" position, in which the vehicle is on (e.g., with power supplied to vehicle systems). The state of the engine and the state of the vehicle may be different. For example, when the vehicle is a hybrid electric vehicle, the vehicle may be on and operating in an electric-only mode in which an electric machine supplies torque to propel the vehicle and the engine is off and does not supply torque to propel the vehicle. As another example, the vehicle may be on and the engine may be shut off during an idle-stop, in which the engine is shut off while the vehicle remains on. In one example, the vehicle may be at rest when the idle-stop is performed. In another example, the vehicle may be in motion (e.g., coasting) when the idle-stop is performed.

At 504, it is determined if an engine cold start condition is present. The cold start condition may be confirmed when the engine is started (e.g., cranked from zero speed to a non-zero speed, with fuel and spark provided to initiated combustion) responsive to an engine start request after a prolonged period of engine inactivity (e.g., after greater than a threshold duration of inactivity) and/or while the engine temperature is lower than a threshold temperature (such as below a light-off temperature the catalyst). As another example, the cold start condition may be confirmed when the engine temperature is substantially equal to the ambient temperature (e.g., within a threshold of the ambient temperature) at engine start. The engine start may be requested by a vehicle operator switching the ignition switch to an "on" position, such as by turning the ignition key, depressing an ignition button, or requesting an engine start from a remote device (such as a key-fob, smartphone, a tablet, etc.). In another example, the engine start may be requested by the controller to transition the vehicle from the electric-only mode to an engine mode in which combustion occurs in the engine and the vehicle is propelled at least partially by engine-derived torque. For example, the vehicle may be transitioned to the engine mode when a state of charge (SOC) of a system battery (e.g., system battery 58 of FIG. 1) drops below a threshold SOC. The threshold SOC may be a positive, non-zero battery SOC level below which the system battery may not be able to support or execute additional vehicle functions while propelling the vehicle via torque derived from the electric machine (e.g., 30%). As another example, the vehicle may be transitioned to the engine mode if torque demand rises above a threshold torque. The threshold torque may be a positive, non-zero amount of torque that cannot be met or sustained by the electric machine alone, for example. In still another example, the engine start may be requested by the vehicle controller to exit an idle-stop.

If an engine cold start condition is present, method 500 proceeds to 506 and includes operating the lift pump in a pressure relief mode and providing fuel via PFI (and not via DI). PFI generally produces lower particulate emissions than DI, and thus it is favorable to use PFI during cold conditions when particulate emissions are worst. For example, fuel may be provided via PFI-only operation for a number of combustion events after the engine start. In another example, fuel may be provided via PFI-only operation until the catalyst reaches its light-off temperature. Operating the lift pump in the pressure relief mode and providing fuel via PFI further includes providing maximum lift pump output to maintain a fixed, mechanically regulated outlet pressure, as indicated at 508. For example, the lift pump may be operated at or near maximum voltage, such as above a threshold voltage, and may be held substantially constant. The threshold voltage corresponds to a non-zero voltage value, such as 10-12 V, at or above which an in-tank pressure relief valve (e.g., pressure relief valve 219) limits the outlet pressure of the lift pump (e.g., to 5 bar), as elaborated with respect to FIG. 2. For example, at voltages below the threshold voltage, the outlet pressure of the lift pump may be below the pressure of the pressure relief valve, and therefore, the outlet pressure may vary with voltage. Conversely, at or above the threshold voltage, variations in the voltage do not result in changes in the lift pump outlet pressure. By operating the lift pump in the pressure relief mode, the PFI fuel rail may be supplied fuel at the outlet pressure of the lift pump (e.g., 5 bar), making the PFI fuel rail pressure knowable for accurate port fuel injections without feedback from a PFI fuel rail sensor. The method may optionally proceed to 524, as will be described below, or may end.

In an alternative example wherein the high pressure fuel pump is configured to further pressurize the fuel provided to the PFI fuel rail, such as the example configuration 300 shown in FIG. 3, operating the lift pump in the pressure relief mode may further include operating a solenoid activated control valve (SACV) of the HPP (e.g., solenoid activated control valve 236) in a pass-through mode, such as by deactivating the SACV. As such, the PFI fuel rail may be maintained at a fixed pressure (e.g., 15 bar) via a pressure relief valve coupled to the PFI fuel rail (e.g., pressure relief valve 246 shown in FIG. 3), making the PFI fuel rail pressure knowable without feedback from a PFI fuel rail sensor, enabling accurate port fuel injections. Furthermore, by delivering fuel via a high pressure port injection during engine cold starts, sufficient fuel atomization may be enabled via the fixed high pressure of the port injection fuel rail while particulate emissions are reduced. However, in such a configuration, the lift pump may be initially operated in the continuous voltage, pressure relief mode and then switched to operating in a pulsed, variable pressure mode. That is, once a fuel passage coupling the lift pump to the high pressure fuel pump is sufficiently pressurized, the lift pump may be operated above vapor pressure, which may be less than the pressure relief mode pressure, while the high pressure fuel pump maintains the high, fixed pressure in the PFI fuel rail even as the lift pump output pressure varies.

Returning to 504, if an engine cold start condition is not present, such as when an engine start is not requested (e.g., the engine is already on and operating) or the engine is warm when the engine start is requested (e.g., a hot start condition is present), method 500 proceeds to 512 and includes determining if the engine speed is greater than a threshold speed. The threshold speed may be a non-zero, positive speed value that refers to a speed above which an amount of time to inject fuel directly to a cylinder may be reduced because of a shortening of time between cylinder combustion events. If the engine speed is greater than the threshold speed, method 500 proceeds to 510 and includes operating the lift pump in the pressure relief mode and providing fuel via a combination of PFI and DI (e.g., PFI+DI). Operating the lift pump in the pressure relief mode includes providing maximum lift pump output, as indicated at 516. As described above at 508, the maximum lift pump output is mechanically regulated by the pressure relief valve. Providing fuel via PFI+DI includes determining a desired DI/PFI split ratio, as indicated at 518. As used herein, the DI/PFI split ratio refers to a portion (e.g., fraction) of a total fuel amount of a given cylinder cycle delivered via port injection, and a remainder of the total fuel amount of the given cylinder cycle delivered via (single or multiple) direct injection. The controller may refer a look-up table stored in a memory of the controller as a function of engine operating conditions, such as engine speed and load, to determine the desired DI/PFI split ratio. As an explanatory example, a table value corresponding to 6000 RPM and 0.2 load may hold empirically determined values 0.8 and 0.2. The value of 0.8 (or 80%) is the PFI fuel fraction, and the value 0.2 (or 20%) is the DI fuel fraction. Consequently, if the total fuel amount is 1 gram during an engine cycle, 0.8 grams of fuel is port injected and 0.2 grams of fuel is direct injected. In another example, the amount of fuel to be delivered via port and direct injectors may be stored in more than one predetermined look-up tables or functions. For example, one table may correspond to determining port injection amounts, and another table may correspond to determining direct injection amounts. The two tables may be indexed to engine operating conditions, such as engine speed and engine load, among other engine operating conditions. Furthermore, the tables may output an amount of fuel to inject via port fuel injection and/or direct injection at each cylinder cycle. Once the desired DI/PFI split ratio is determined, the controller may send a signal with a corresponding pulse width to the appropriate injector at a timing determined for the engine operating conditions.

Providing fuel via PFI+DI further includes selecting a DI fuel rail pressure setpoint, as indicated at 520, and adjusting an output of the HPP responsive to DI fuel rail pressure errors to vary a pump volume per stroke, as indicated at 522. As one example, the controller may vary the DI fuel rail pressure setpoint responsive to one or more operating conditions, including engine speed, engine load, torque demand, fuel consumption rate, and various ambient conditions. For example, the controller may input the one or more operating conditions into a look-up table or map stored in a memory of the controller and output the DI fuel rail setpoint. As one non-limiting example, the DI fuel rail pressure may be selected so that the pulse width of the direct injectors can be maintained above a minimum pulse width for the desired fuel injection amount. The pump command provided to the HPP may be adjusted responsive to the DI fuel rail pressure errors obtained from comparing the selected DI fuel rail pressure setpoint and a measured DI fuel rail pressure (e.g., as measured by pressure sensor 248 shown in FIGS. 2-3). As one non-limiting example, when the measured DI fuel rail pressure is less than the DI fuel rail pressure setpoint, the pump command provided to the HPP may be adjusted to increase an effective volume per stroke of the HPP, thereby increasing the fuel pressure at the DI fuel rail. For example, the effective volume per stroke may be increased by advancing a timing of a command signal from the controller relative to a position of a cam driving the HPP (e.g., cam 230 of FIG. 3). As another example, when the DI fuel rail pressure is higher than the DI fuel rail pressure setpoint, the pump command may be adjusted to reduce the effective volume of each pump stroke, such as by retarding the timing of the command signal provided by the controller relative to the position of the cam.

At 524, method 500 includes measuring a fractional volume loss of the HPP to determine a pump model correction term. That is, while the lift pump is operating in the pressure relief mode (e.g., at the mechanically regulated pressure), the controller may opportunistically learn (e.g., self-calibrate) a volume loss associated with high (e.g., maximum) HPP inlet pressure, when the HPP volumetric efficiency is maximal, in order to adjust the pump model to the actual HPP performance. In one example, the volume loss associated with the high HPP inlet pressure may be computed as: $VL_{max} = V_{model} - V_{actual}$, where $V_{model}$ is a modeled volume pumped (e.g., determined from an a priori HPP model) and $V_{actual}$ is an actual volume pumped by the HPP. $V_{model}$ may be calculated as:

$$V_{model} = 1 - A - \left(\frac{B \times FRP \times DC}{N}\right) - (C \times FRP \times DC),$$

where A is an offset term, B is a leak term, C is a compressibility term, FRP is a fuel rail pressure of the DI fuel rail, N is engine speed, and DC is a duty cycle of the HPP. For example, terms A, B, and C may be precalibrated terms stored in a memory of the controller, whereas FRP, N, and DC are currently measured operating conditions. $V_{actual}$ may be determined based on a measured DI fuel rail pressure and an amount of fuel injected. $VL_{max}$ may then be converted to a fractional volume loss ($FVL_{max}$) by dividing $VL_{max}$ by the full pump displacement (e.g., a known displacement of the HPP per stroke at the given pump command duty cycle and driven speed, N). The fractional volume loss may be used to determine a corrected pump model ($V_{corrected}$): $V_{corrected} = V_{model} + V_{adder}$, where $V_{adder}$ is an additive correction term equal to $FVL_{max}$ multiplied the pump displacement. At full commanded pump displacement, $V_{adder}$ is equal to $VL_{max}$ but differs at partial commanded displacement. The corrected pump model may be used for lift pump control during DI-only operation, as will be further described below, such that the fractional volume loss at lower HPP pump inlet pressures is matched to the fractional volume loss when the HPP pump inlet pressure is maximum (e.g., FVL is kept constant while the correction volume changes based on the commanded pump displacement).

In some examples during PFI-only operation, the controller may further use the volumetric efficiency learning at 524 to opportunistically check calibration of the direct fuel injectors. For example, the controller may temporarily command the HPP to deliver pressurized fuel to the DI fuel rail until a desired FRP is reached. While the HPP is operating, the volumetric efficiency may be determined. A small amount of fuel may then be directly injected in a predetermined injector sequence, which may be repeated a desired number of times (e.g., three). A corresponding amount of fuel may be subtracted from the port fuel injection to compensate for the direct injected fuel and maintain a desired air-fuel ratio. The controller may determine the FRP drop in the DI fuel rail during each direct injection to determine an (average) amount of fuel actually injected by each direct injector and compare it to a desired (e.g., commanded) amount. The controller may then determine a correction coefficient for each injector, which may be used during subsequent DI operation. Following 524, method 500 ends.

Returning to 512, if the engine speed is not greater than the threshold speed (e.g., the engine speed is less than or equal to the threshold speed), method 500 proceeds to 526 and includes operating the lift pump in a variable pressure mode and providing fuel via DI (and not via PFI). Operating the lift pump in the variable pressure mode and providing fuel via DI includes selecting the DI fuel rail pressure setpoint based on operating conditions, as indicated at 528. As one example, the controller may vary the DI fuel rail pressure setpoint responsive to one or more operating conditions including engine speed, engine load, torque demand, fuel consumption rate, and various ambient conditions. For example, the controller may input the current operating conditions into one or more look-up tables, algorithms, or maps stored in memory of the controller and output the DI fuel rail setpoint. As one non-limiting example, the DI fuel rail pressure may be selected so that the pulse width of the direct injectors can be maintained above a minimum pulse width for the desired fuel injection amount. As another example, the DI fuel rail pressure setpoint may correspond to a commanded pump displacement. Furthermore, the controller may use the corrected pump model, determined during PFI operation when the lift pump is operated in the pressure relief mode (e.g., at 524), to determine a corrected modeled volume pumped ($V_{corrected}$) for the current operating conditions (e.g., FRP, N, and DC).

As described above at 522, providing fuel via DI further includes adjusting the HPP output responsive to DI fuel rail pressure errors to vary the pump volume per stroke, as indicated at 530. Further still, operating the lift pump in the variable pressure mode and providing fuel via DI includes adjusting the lift pump output based on a fractional volume loss error, as indicated at 532. For example, the controller may compare $V_{corrected}$, which serves as a desired volume pumped, with the actual (measured) volume pumped, $V_{actual}$, to determine a volume loss at the given operating conditions ($VL_{current}$): $VL_{current} = V_{corrected} - V_{actual}$. $VL_{current}$ may then be converted to a current fractional volume loss ($FVL_{current}$) and compared with $FVL_{max}$ to determine the fractional volume loss error ($FVL_{error}$): $FVL_{error} = FVL_{current} - FVL_{max}$. The controller may then adjust the lift pump output based on $FVL_{error}$. For example, when the fractional volume loss error is greater than a threshold error (e.g., $FVL_{current}$ is greater than $FVL_{max}$ by a threshold amount), the lift pump output may be increased in order to decrease $FVL_{current}$. As another example, when $FVL_{current}$ is equal to $FVL_{max}$, there is no additional fractional volume loss, meaning that the HPP is operating at full volumetric efficiency. The threshold error may correspond to a minimum desired volumetric efficiency of the HPP. That is, when $FVL_{error}$ is greater than the threshold error, the lift pump output is not great enough to produce the minimum desired HPP volumetric efficiency, which may result in unintended decreases in the DI fuel rail pressure, for example. When the fractional volume loss error is less than the threshold error, the lift pump output may be decreased. That is, the lift pump output may be greater than needed to produce the desired minimum HPP volumetric efficiency, resulting in greater electrical power consumption, for example. As an example, the threshold error may be a positive, non-zero value in a range of 5 to 20%. The threshold error value may be a value stored in a memory of the controller that was empirically determined through HPP fractional volume loss and lift pump output measurements. For example, a threshold error of less than 5% may result in degraded lift pump control due to noise in the HPP fractional volume loss calculation, and a threshold magnitude of greater than 20% may result in insufficient pressure at the inlet of the HPP. Thus, the fractional volume loss error of the HPP serves as feedback for controlling the lift pump during DI-only operation to maintain the HPP at the minimum desired volumetric efficiency. The lift pump output may be adjusted by adjusting the voltage provided to the lift pump. For example, the voltage provided to the lift pump may be increased to increase the lift pump output, and the voltage provided to the lift pump may be decreased to decrease the lift pump output. Furthermore, the lift pump may be operated in a pulsed mode of operation while providing fuel via DI-only in order to further decrease electrical power consumption. Adjusting the lift pump output may further include adjusting a duration of each voltage pulse supplied to the lift pump as well as an interval between each voltage pulse (e.g., a duty cycle of the lift pump). By controlling the lift pump so that the HPP maintains the minimum volumetric efficiency, the overall efficiency of the fuel supply system may be increased. Following 532, method 500 ends.

Thus, the method of FIG. 5 may include selecting between operating the lift pump in the pressure relief mode and operating the lift pump in the variable pressure mode based on whether port fuel injection is desired. As an example, the controller may only select between operating the lift pump in the pressure relief mode and operating the lift pump in the variable pressure mode such that during any given condition, the lift pump is operated in either the pressure relief mode or the variable pressure mode and not any other mode. As another example, method 500 of FIG. 5 may include operating the lift pump in the pressure relief mode with the port fuel injectors active, and operating the lift pump in the variable pressure mode with the port fuel injectors deactivated.

As another example, the method of FIG. 5 may include determining a port fuel injection condition, and in response thereto, operating the lift pump in the pressure relief mode; and determining a direct injection-only condition, and in response thereto, operating the lift pump in the variable pressure mode. In some examples, operating the lift pump in the pressure relief mode occurs while or during port fuel injection, which may or may not additionally include direct injection, and operating the lift pump in the variable pressure mode occurs while port fuel injection is not performed. Further, instructions stored in memory may include determining the port fuel injection condition from an engine speed sensor (e.g., Hall effect sensor 120 of FIG. 1) or from an engine temperature sensor (e.g., engine coolant temperature sensor 116 of FIG. 1) in combination with an engine start request, and in response, controlling the lift pump in the pressure relief mode by instructions for sending a signal to a motor of the lift pump; and determining the direct injection-only condition from the engine speed sensor, from the engine temperature sensor in combination with the engine start request, or from operation in a variable displacement engine mode, and in response, controlling the lift pump in the variable pressure mode by instructions for sending a different signal to the motor of the lift pump. In some examples, the method may include determining whether to perform one or more of each of port fuel injection and direct injection based on a determination of whether a cold start condition is present and a determination of whether the engine speed is greater than a threshold.

In this way, the fuel system may be efficiently controlled while accurately providing fuel via PFI and/or DI based on operating conditions. By operating the lift pump in the variable pressure mode using closed loop pump control during DI-only operation, electrical power consumption is reduced. By operating the lift pump in the pressure relief mode using open loop pump control during PFI operation (e.g., both PFI-only operation and PFI+DI operation), additional electrical power is consumed by the lift pump, but the PFI injection pressure is known without a pressure sensor, reducing vehicle costs. Furthermore, operation in the pressure relief mode opportunistically enables a determination of the fractional volume loss at maximum HPP inlet pressure ($FVL_{max}$) and the corrected pump model, which reduces sensitivity to variations in HPP parameters (e.g., an electrical current waveform to the solenoid activated control valve, a cam position, pump speed, etc.) in the accuracy of the lift pump control.

Next, FIG. 6 shows a graph 600 of controlling a PFDI fuel system of a rVDE engine, such as the fuel system shown in FIG. 2 and the engine system shown in FIG. 1. In particular, a fuel lift pump (e.g., LPP 212 of FIG. 2) may be transitioned between operating modes (e.g., a variable pressure mode and a pressure relief mode) based on a current fuel injection location, such as according to the method of FIG. 5. Engine speed is shown in plot 602, an engine mode is shown in plot 604, the fuel injection location is shown in 606, a pressure of a fuel passage (e.g., low pressure fuel passage 218 of FIG. 2) is shown in plot 610, a fractional volume loss error of a high pressure pump (e.g., HPP 214 of FIG. 2) is shown in plot 612, and a voltage supplied to the lift pump is shown in plot 614. For all of the above, the horizontal axis represents time, with time increasing along the horizontal axis from left to right. The vertical axis represents each labeled parameter, with values increasing from bottom to top, except for plot 604, in which the vertical axis represents whether the engine is operating in a VDE mode or a non-VDE mode (as labeled), and plot 606, in which the vertical axis represents the fuel injection location (PFI, DI, or PFI+DI, as labeled). Furthermore, a threshold engine speed is represented by dashed line 616, above which the engine is fueled via both PFI and DI (e.g., PFI+DI), a maximum fuel passage pressure is represented by dashed line 620, a threshold fractional volume loss error is represented by dashed line 626, and a threshold lift pump voltage is represented by dashed line 628. Note that the fuel passage pressure value is an inferred value based on the output of the lift pump and a pressure setpoint of a pressure relief valve (e.g., in-tank pressure relief valve 219 of FIG. 2).

At time t1, the engine is cold-started from rest, resulting in an increase in the engine speed (plot 602) as the engine is cranked. At start, the engine is operated in the non-VDE mode (plot 604), with all of its cylinders activated (e.g., intake and exhaust valves of each cylinder are activated, and fuel is provided to every cylinder). Due to the cold start, fuel is provided via PFI-only operation (plot 606). Because fuel is provided via PFI, the lift pump is operated in the pressure relief mode, and the voltage supplied to the lift pump (plot 614) is greater than the threshold voltage (dashed line 628). Additionally, the lift pump is operated in a continuous voltage mode, and substantially constant voltage is supplied to the lift pump. With the lift pump voltage greater than the threshold, the fuel passage pressure (plot 610) is quickly raised to the maximum fuel passage pressure (dashed line 620), which is the pressure setpoint of the pressure relief valve. As such, the PFI fuel rail pressure is also equal to the pressure setpoint of the pressure relief valve. Note that between time t1 and time t2, a fractional volume loss error of the HPP is not determined because the HPP is not used. In other examples, the HPP may be temporarily activated in order to calibrate the direct injectors and determine a fractional volume loss at the maximum HPP inlet pressure.

After a number of engine cycles, at time t2, fuel system is transitioned to providing fuel via DI-only operation (plot 606). A controller (e.g., controller 12 of FIGS. 1 and 2) selects a desired DI FRP and adjusts HPP operation to provide the desired DI FRP, such as by utilizing a solenoid activated control valve. While providing fuel via DI-only operation, the lift pump is operated in the variable pressure mode using closed loop, pulsed pump control. That is, the voltage supplied the lift pump (plot 614) is varied and is less than the threshold voltage (dashed line 628), varying the pressure of fuel output by the lift pump. For example, between lift pump voltage pulses (e.g., when the lift pump voltage is set to zero), the (inferred) fuel passage pressure decreases and increases again with each non-zero voltage pulse, as shown in plot 610. During operation in the variable pressure mode, the lift pump voltage is varied based on the fractional volume loss error of the HPP (plot 612) in order to maintain a minimum HPP volumetric efficiency corresponding to the threshold fractional volume loss error (dashed line 626), as will be further described below.

At time t3, the engine speed (plot 602) remains below the threshold speed (dashed line 616). Furthermore, entry conditions for the VDE mode are met, such as when engine load is less than a threshold load (not shown). Therefore, the engine is transitioned to operating in the VDE mode (plot 604), such as according to the method of FIG. 4. The VDE mode may be a rolling VDE mode, in which one or more cylinders are deactivated in a selected pattern. Furthermore, the selected pattern may vary while operating in the VDE mode. The one or more cylinders are deactivated by disabling fuel injection to the one or more cylinders and maintaining intake and exhaust valves of the one or more cylinders closed. Additionally, while operating in the VDE mode, fuel continues to be injected via DI-only (plot 606), and so the lift pump continues to be operated in the variable pressure mode.

Between time t2 and time t4, the HPP fractional volume loss error (plot 612) is less than the threshold fractional volume loss error (dashed line 626). In response, the lift pump voltage is decreased, such as by decreasing an amount of voltage supplied during each voltage pulse. The current fractional volume loss error may be determined in part by using the fractional volume loss at maximum HPP inlet pressure obtained during a previous self-calibration while operating the lift pump in the pressure relief mode. At time t4, the HPP fractional volume loss error (plot 612) increases above the fractional volume loss error (dashed line 626). In response, the voltage supplied to the lift pump is increased, such as by increasing a duty cycle of voltage supplied to the lift pump. In this way, the lift pump may be controlled such that the voltage supplied to the lift pump is varies based on the HPP fractional volume loss error in order to maintain the volumetric efficiency of the HPP at the minimum volumetric efficiency while injecting fuel via DI-only.

At time t5, the engine is transitioned to the non-VDE mode (plot 604) in response to conditions for exiting the VDE mode being met, such as when the engine load is greater than the threshold (not shown). As a result, the intake and exhaust valves of all of the cylinders are active, and fuel is delivered to every cylinder. Fuel continues to be provided via DI-only (plot 606) since the engine speed is less than the threshold engine speed (dashed line 616). As such, the lift pump continues to be operated in the variable pressure mode such that the voltage supplied to the lift pump (plot 614) is varied and is less than the threshold voltage (dashed line 628).

At time t6, the engine speed (plot 602) surpasses the threshold engine speed (dashed line 616). As such, fuel is provided via PFI+DI (plot 606) due to a limited amount of time to perform the direct injection. With fuel at least partially provided via PFI, the lift pump is again operated in the pressure relief mode. The voltage supplied to the lift pump (plot 614) is increased to above the threshold voltage (dashed line 628), and the fuel passage pressure (plot 610) is increased to the maximum fuel passage pressure (dashed line 620). As shown in plot 612, the HPP fractional volume loss error decreases to zero. While DI is performed and the lift pump is operated in the pressure relief mode, with maximum lift pump outlet pressure, the controller may learn the fractional volume loss at maximum pressure, which may be used in subsequent lift pump control while operating in the variable pressure mode.

In this way, a PFDI fuel system in a rolling variable displacement engine may be efficiently operated without a pressure sensor for measuring output of a lift pump. For example, when injecting fuel via direct injection only, instead of controlling the lift pump output using feedback from a pressure sensor, the lift pump is controlled based on a volumetric efficiency (and a fractional volume loss error) of a direct injection pump. When port fuel injection is performed, including when fuel is injected via both PFI and DI, a PFI fuel rail is operated using open loop control at a fixed pressure (e.g., via a pressure relief valve), such as by increasing the lift pump output to a maximum, mechanically regulated pressure. Although operating at the mechanically regulated pressure increases lift pump usage, PFI is so rarely performed due to the fuel economy savings of the rVDE technology that cost savings of operating the PFDI fuel system without a pressure sensor on the low pressure side outweigh the additional power consumption from the increased lift pump usage. Furthermore, while operating at the mechanically regulated pressure, for a corrected pump model and a fractional volume loss at maximum lift pump output for the volumetric efficiency-based control may be opportunistically learned, which may increase an accuracy of the lift pump control during DI-only operation.

The technical effect of operating a lift pump of a PFDI fuel system in a variable displacement engine without lift pump output pressure feedback is that vehicle costs may be decreased while electrical power consumption increases are minimized.

As one example, a method for fueling an engine, comprises: selecting between operating a lift pump in a pressure relief mode and a variable pressure mode based on whether the engine is fueled via port fuel injectors; and adjusting an output of the lift pump while operating in the variable pressure mode based on a fractional volume loss of a high pressure pump measured while operating the lift pump in the pressure relief mode. In the preceding example, additionally or optionally, operating the lift pump in the pressure relief mode includes supplying fuel at a fixed lift pump outlet pressure, and operating the lift pump in the variable pressure mode includes supplying fuel at a variable lift pump outlet pressure that is less than the fixed lift pump outlet pressure. In any or all of the preceding examples, additionally or optionally, the fixed lift pump outlet pressure is a pressure setpoint of a first mechanical pressure relief valve, the first mechanical pressure relief valve positioned downstream of the lift pump with no additional pressure relief valves positioned in between. In any or all of the preceding examples, additionally or optionally, a pressure at the port fuel injectors is equal to the fixed lift pump outlet pressure while the lift pump is operated in the pressure relief mode. In any or all of the preceding examples, additionally or optionally, the high pressure pump is coupled downstream of the lift pump with no additional pump positioned in between the high pressure pump and the lift pump, and the high pressure pump increases a pressure of fuel at one or more of the port fuel injectors and direct injectors. In any or all of the preceding examples, additionally or optionally, the pressure of fuel at the port fuel injectors is a fixed pressure that is greater than the fixed lift pump outlet pressure, and the pressure of fuel at the direct injectors is a variable pressure that is greater than or equal to the fixed pressure. In any or all of the preceding examples, additionally or optionally, the pressure of fuel at the port fuel injectors is a pressure setpoint of a second mechanical pressure relief valve, the second mechanical pressure relief valve positioned upstream of the port fuel injectors with no additional pressure relief valves positioned in between. In any or all of the preceding examples, additionally or optionally, the selecting between operating the lift pump in the pressure relief mode and the variable pressure mode includes selecting the pressure relief mode when the engine is fueled at least partially via the port fuel injectors and selecting the variable pressure mode when the engine is fueled via the direct injectors only. In any or all of the preceding examples, additionally or optionally, operating the lift pump in the pressure relief mode includes supplying voltage to the lift pump that is greater than or equal to a threshold voltage, and operating the lift pump in the variable pressure mode includes supplying voltage to the lift pump that is less than the threshold voltage. In any or all of the preceding examples, additionally or optionally, the adjusting the output of the lift pump while operating in the variable pressure mode is further based on a fractional volume loss error value of the high pressure pump.

As another example, a method comprises: providing fuel to an engine via direct injection while the engine is operating in a variable displacement mode; selecting between providing fuel via direct injection, port fuel injection, or both port fuel injection and direct injection while operating outside of the variable displacement mode; controlling a lift pump to output fuel to a direct injection fuel pump at a variable pressure based on a fractional volume loss error of the direct injection fuel pump while providing fuel via direct injection; and controlling the lift pump to output fuel to the direct injection fuel pump and a port fuel injection fuel rail at a fixed pressure regulated by a pressure relief valve while providing fuel via port fuel injection or both port fuel injection and direct injection. In the preceding example, additionally or optionally, a pressure of the port fuel injection fuel rail is an inferred pressure. In any or all of the preceding examples, additionally or optionally, the inferred pressure is equal to the fixed pressure regulated by the pressure relief valve while controlling the lift pump to output fuel at the fixed pressure. In any or all of the preceding examples, additionally or optionally, back-flow from the direct injection fuel pump further pressurizes fuel provided to the port fuel injection fuel rail, and the inferred pressure is equal to a pressure setpoint of a second pressure relief valve positioned downstream of the direct injection fuel pump and upstream of the port fuel injection fuel rail. In any or all of the preceding examples, additionally or optionally, controlling the lift pump to output fuel to the direct injection fuel pump at the variable pressure based on the fractional volume loss error of the direct injection fuel pump includes increasing a voltage supplied to the lift pump when the fractional volume loss error is greater than a threshold, and decreasing the voltage supplied to the lift pump when the fractional volume loss error is less than the threshold.

As another example, a system for a vehicle, comprises: a controller with computer-readable instructions stored on non-transitory memory that, when executed, cause the controller to: deliver fuel to an engine of the vehicle via a fuel system, the fuel system including direct injectors coupled to a first fuel rail and port fuel injectors coupled to a second fuel rail, each coupled to a low pressure pump positioned within a fuel tank; operate the low pressure pump to output fuel at a mechanically regulated pressure when fuel is delivered by the port fuel injectors or the port fuel injectors and the direct injectors; and operate the low pressure pump to output fuel at a pressure lower than the mechanically regulated pressure when fuel is delivered by the direct injectors only. In the preceding example, the system additionally or optionally further comprises a pressure relief valve positioned within the fuel tank and coupled to an outlet of the low pressure pump, and wherein the mechanically regulated pressure is a pressure setpoint of the pressure relief valve. In any or all of the preceding examples, additionally or optionally, the engine is a variable displacement engine, and the controller holds further computer-readable instructions stored on non-transitory memory that, when executed, cause the controller to: selectively deactivate one or more cylinders of the engine based on at least engine load; deliver fuel to remaining active cylinders by the direct injectors only while one or more cylinders are selectively deactivated; and select between delivering fuel by the direct injectors only, the port fuel injectors only, or the direct injectors and the port fuel injectors based on at least one of engine speed and an engine cold start condition while all of the cylinders are active. In any or all of the preceding examples, additionally or optionally, operating the low pressure pump to output fuel at the mechanically regulated pressure includes supplying a first voltage that is greater than a threshold voltage to the lift pump. In any or all of the preceding examples, the system additionally or optionally further comprises a high pressure pump coupled between the first fuel rail and the low pressure pump, and wherein operating the low pressure pump to output fuel at the pressure lower than the mechanically regulated pressure includes supplying a second voltage that is less than the threshold voltage to the lift pump, with the second voltage varied to maintain a volumetric efficiency of the high pressure pump.

In another representation, a method comprises: selecting between controlling a lift pump to output fuel at a mechanically limited pressure and controlling the lift pump to output fuel at a pressure lower than the mechanically limited pressure based on a fuel injection location; and adjusting the pressure lower than the mechanically limited pressure based on a fractional volume loss of a high pressure pump measured while controlling the lift pump to output fuel at the mechanically limited pressure. In the preceding example, additionally or optionally, selecting between controlling the lift pump to output fuel at the mechanically limited pressure and controlling the lift pump to output fuel at the pressure lower than the mechanically limited pressure based on the fuel injection location includes: selecting controlling the lift pump to output fuel at the mechanically limited pressure in response to the fuel injection location including port fuel injection; and selecting controlling the lift pump to output fuel at the pressure lower than the mechanically limited pressure in response to the fuel injection location not including port fuel injection. In any or all of the preceding examples, additionally or optionally, the fractional volume loss of the high pressure pump measured while controlling the lift pump to output fuel at the mechanically limited pressure is measured while providing fuel via both port fuel injection and direct injection. In any or all of the preceding examples, additionally or optionally, adjusting the pressure lower than the mechanically limited pressure based on the fractional volume loss of the high pressure pump measured while controlling the lift pump to output fuel at the mechanically limited pressure maintains a volumetric efficiency of the high pressure pump at a desired volumetric efficiency.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
a controller with computer-readable instructions stored on non-transitory memory that, when executed, cause the controller to:
deliver fuel to an engine of the vehicle via a fuel system, the fuel system including direct injectors coupled to a first fuel rail and port fuel injectors coupled to a second fuel rail, each coupled to a low pressure pump positioned within a fuel tank, and a high pressure pump coupled between the first fuel rail and the low pressure pump;
operate the low pressure pump to output fuel at a mechanically regulated pressure when fuel is delivered by only the port fuel injectors or the port fuel injectors and the direct injectors during a pressure relief mode in response to a cold-start and in response to an engine speed being greater than a threshold speed, the pressure relief mode comprising supplying a first voltage that is greater than a threshold voltage to the low pressure pump; and
operate the low pressure pump to output fuel at a pressure lower than the mechanically regulated pressure when fuel is delivered by only the direct injectors during a variable pressure mode in response to the engine speed being less than or equal to the threshold speed, the variable pressure mode comprising supplying a second voltage that is less than the threshold voltage to the low pressure pump.

2. The system of claim 1, further comprising a pressure relief valve positioned within the fuel tank and coupled to an outlet of the low pressure pump, and wherein the mechanically regulated pressure is a pressure setpoint of the pressure relief valve.

3. The system of claim 1, wherein the engine is a variable displacement engine, and the controller holds further computer-readable instructions stored on non-transitory memory that, when executed, cause the controller to:
selectively deactivate one or more cylinders of the engine based on at least engine load;
deliver fuel to remaining active cylinders by the direct injectors only while one or more cylinders are selectively deactivated; and
select between delivering fuel by the direct injectors only, the port fuel injectors only, or the direct injectors and the port fuel injectors based engine speed and the engine cold start condition while all of the cylinders are active.

4. The system of claim 1, wherein the second voltage is varied to maintain a volumetric efficiency of the high pressure pump.

5. A vehicle system, comprising:
an engine;
a fuel system comprising a plurality of direct injectors coupled to a first fuel rail and a plurality of port fuel injectors coupled to a second fuel rail;
a lift pump positioned within a fuel tank, the lift pump fluidly coupled to each of the first fuel rail and the second fuel rail;
a direct injection fuel pump arranged between the first fuel rail and the lift pump, wherein the direct injection fuel pump is a higher pressure pump than the lift pump; and
a controller with computer-readable instructions stored on non-transitory memory thereof that when executed enable the controller to:
control the lift pump to deliver fuel to the first fuel rail at a variable pressure when an engine speed is less than or equal to a threshold speed based on a fractional volume loss error of the direct injection fuel pump while injecting fuel via only the plurality of direct injectors;
control the lift pump to output fuel to the first fuel rail and the second fuel rail at a fixed pressure regulated by a pressure relieve valve while providing fuel via only the plurality of port fuel injectors or both the plurality of port fuel injectors and the plurality of port fuel injectors during a cold-start; and
supply a first voltage to the lift pump to obtain the fixed pressure, wherein the first voltage is greater than or equal to a threshold voltage, and supply a second voltage to the lift pump to obtain the variable pressure, wherein the second voltage is less than the threshold voltage.

6. The vehicle system of claim 5, wherein a pressure of the second fuel rail is an inferred pressure, wherein the inferred pressure is equal to the fixed pressure regulated by the pressure relief valve while the lift pump is controlled to output fuel at the fixed pressure.

7. The vehicle system of claim 6, wherein the pressure relief valve is position within the fuel tank and coupled to an outlet of the lift pump, and wherein the fixed pressure is a pressure setpoint of the pressure relief valve.

8. The vehicle system of claim 6, wherein the pressure relief valve is a first pressure relief valve, and wherein back-flow from the direct injection fuel pump further pressurizes fuel provided to the second fuel rail, wherein the inferred pressure is equal to a pressure setpoint of a second pressure relief valve positioned downstream of the direct injection fuel pump and upstream of the second fuel rail.

9. The vehicle system of claim 5, wherein the lift pump is controlled to output fuel to the direct injection fuel pump at the variable pressure based on the fractional volume loss error of the direction injection fuel pump includes increasing a voltage supplied to the lift pump when the fractional volume loss error is greater than a threshold, and decreasing the voltage supplied to the lift pump when the fractional volume loss error is less than the threshold.

10. The vehicle system of claim 5, wherein the engine is a variable displacement engine, and wherein the instructions further enable the controller to:
selectively deactivate one or more cylinders of the engine based on at least an engine load;
deliver fuel to remaining active cylinders via only the plurality of direct injectors while one or more cylinders are selectively deactivated; and
select between delivering fuel via only the plurality of direct injectors, only the plurality of port fuel injectors, or via both the plurality of direct injectors and the plurality of port fuel injectors based an engine speed and a cold start condition while all cylinders are active.

11. A vehicle system, comprising:
an engine;
a fuel system comprising a plurality of direct injectors coupled to a first fuel rail and a plurality of port fuel injectors coupled to a second fuel rail;
a lift pump positioned within a fuel tank, the lift pump fluidly coupled to each of the first fuel rail and the second fuel rail;
a high pressure pump arranged between the first fuel rail and the lift pump, wherein the high pressure pump pumps at a higher pressure than the lift pump; and
a controller with computer-readable instructions stored on non-transitory memory thereof that when executed enable the controller to:
select between operating the lift pump in a pressure relief mode and a variable pressure mode based on a fueling of the engine via the plurality of port fuel injectors;
adjust an output of the lift pump while operating in the variable pressure mode based on a fractional volume loss of the high pressure pump measured while operating the lift pump in the pressure relief mode and an engine speed being less than or equal to a threshold speed; and
supply a first voltage to the lift pump that is greater than or equal to a threshold voltage during the pressure relief mode, and wherein the instructions further enable the controller to supply a second voltage to the lift pump that is less than the threshold voltage during the variable pressure mode during a cold-start.

12. The vehicle system of claim 11, wherein the pressure relief mode further comprises supplying fuel at a fixed lift pump outlet pressure, and wherein the variable pressure mode further comprises supplying fuel at a variable lift pump outlet pressure that is less than the fixed lift pump outlet pressure.

13. The vehicle system of claim 12, wherein the fixed lift pump outlet pressure is a pressure setpoint of a first mechanical pressure relief valve, the first mechanical pressure relief valve positioned downstream of the lift pump with no additional pressure relief valves positioned in between, and wherein a fuel pressure at the plurality of port fuel injectors is a pressure setpoint of a second mechanical pressure relief valve, the second mechanical pressure relief valve is positioned upstream of the plurality of port-fuel injectors with no additional pressure relief valves positioned therebetween.

14. The vehicle system of claim 11, wherein the high pressure pump is coupled downstream of the lift pump relative to a direction of fuel flow with no additional pumps positioned between the high pressure pump and the lift pump.

15. The vehicle system of claim 14, wherein the high pressure pump increases a pressure of fuel at one or more of the plurality of direct injectors and the plurality of port fuel injectors.

16. The vehicle system of claim 15, wherein the pressure of fuel the plurality of port fuel injectors is an inferred pressure based on a fixed pressure regulated via a pressure relief valve while controlling the lift pump to output fuel at the fixed pressure during the pressure relief mode.

\* \* \* \* \*